United States Patent
Miyachi et al.

(10) Patent No.: US 8,586,266 B2
(45) Date of Patent: Nov. 19, 2013

(54) SOLID ELECTROLYTE MULTILAYER MEMBRANE, METHOD AND APPARATUS FOR PRODUCING THE SAME, MEMBRANE ELECTRODE ASSEMBLY, AND FUEL CELL

(75) Inventors: Hiroshi Miyachi, Kanagawa (JP); Ryo Takeda, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 396 days.

(21) Appl. No.: 11/994,908

(22) PCT Filed: Jul. 5, 2006

(86) PCT No.: PCT/JP2006/313812
§ 371 (c)(1),
(2), (4) Date: Jan. 7, 2008

(87) PCT Pub. No.: WO2007/007773
PCT Pub. Date: Jan. 18, 2007

(65) Prior Publication Data
US 2009/0130525 A1    May 21, 2009

(30) Foreign Application Priority Data

Jul. 7, 2005 (JP) ................................. 2005-198376
Mar. 29, 2006 (JP) ................................. 2006-089811

(51) Int. Cl.
*H01M 8/10* (2006.01)
*B28B 5/00* (2006.01)

(52) U.S. Cl.
USPC ........... 429/535; 429/491; 429/492; 429/493; 429/494; 264/241; 425/224

(58) Field of Classification Search
USPC .................... 429/33, 491–494, 535; 264/241; 425/224
See application file for complete search history.

(56) References Cited

U.S. PATENT DOCUMENTS

| 2003/0013602 A1* | 1/2003 | Uchida et al. ................. 502/101 |
| 2003/0173703 A1 | 9/2003 | Yamazaki et al. |
| 2004/0030005 A1 | 2/2004 | Katai et al. |
| 2004/0214065 A1* | 10/2004 | Kanaoka et al. ................. 429/33 |

FOREIGN PATENT DOCUMENTS

| EP | 1 304 754 A1 | 4/2003 |
| EP | 1 463 140 A2 | 9/2004 |
| JP | 9320617 A | 12/1997 |
| JP | 2001307752 A | 11/2001 |
| JP | 2002-110174 A | 4/2002 |
| JP | 2002231270 A | 8/2002 |

(Continued)

OTHER PUBLICATIONS

Machine translation of JP 2005146018 A, Goto et al., Jun. 2005.*

(Continued)

*Primary Examiner* — Sean P Cullen
(74) *Attorney, Agent, or Firm* — Sughrue Mion, PLLC

(57) ABSTRACT

First, second and third dopes each of which contains a solid electrolyte and an organic solvent are cast from a casting die provided with a feed block to a moving belt. A three-layer casting membrane is peeled off from the belt as a three-layer membrane containing the organic solvent. After being dried in a tenter device, the membrane still containing the organic solvent is contacted with a liquid which is a poor solvent of the solid electrolyte and having lower boiling point than the organic solvent. Thereafter, the membrane is transported to a drying chamber and dried while being supported by the plural rollers.

14 Claims, 6 Drawing Sheets

(56) References Cited

FOREIGN PATENT DOCUMENTS

| | | |
|---|---|---|
| JP | 2004-025793 A | 1/2004 |
| JP | 2004066136 A | 3/2004 |
| JP | 2004079378 A | 3/2004 |
| JP | 2004131530 A | 4/2004 |
| JP | 2004178995 A | 6/2004 |
| JP | 2005-146018 A | 6/2005 |
| JP | 2005171025 A | 6/2005 |
| JP | 2005235466 A | 9/2005 |
| JP | 2005310643 A | 11/2005 |
| JP | 2006-253002 A | 9/2006 |
| WO | 02/25764 A1 | 3/2002 |
| WO | 03/033566 A1 | 4/2003 |

OTHER PUBLICATIONS

EP Communication, dated Sep. 22, 2009, issued in corresponding EP Application No. 06780982.2, 10 pages.

Notification of Reasons for Refusal, dated Feb. 8, 2012, issued in corresponding JP Application No. 2006-089811, 6 pages in English and Japanese.

* cited by examiner

SOLID ELECTROLYTE MULTILAYER MEMBRANE, METHOD AND APPARATUS FOR PRODUCING THE SAME, MEMBRANE ELECTRODE ASSEMBLY, AND FUEL CELL

TECHNICAL FIELD

The present invention relates to a solid electrolyte multilayer membrane, a method and an apparatus for producing the same, membrane electrode assembly and a fuel cell using the solid electrolyte multilayer membrane, in particular, the present invention relates to a solid electrolyte multilayer membrane having proton conductivity used for the fuel cell, a method and an apparatus for producing the same, membrane electrode assembly and the fuel cell using the solid electrolyte multilayer membrane.

BACKGROUND ART

Recently, active research has been directed to lithium ion batteries and fuel cells used as power sources for mobile appliances, and to solid electrolyte membranes constituting the above batteries or cells. The solid electrolyte membranes are, for instance, lithium ion conductive materials and proton conductive materials.

Generally, the proton conductive material is formed in a membrane form. The solid electrolyte in the membrane form used as a solid electrolyte layer of the battery or the cell such as the fuel cell, and a producing method thereof are suggested in the following. For instance, Japanese Patent Laid-Open Publication No. 9-320617 suggests a method in which polyvinylidene fluoride resin is immersed into a liquid mixture of an electrolyte and a plasticizer. Japanese Patent Laid-Open Publication No. 2001-307752 suggests a producing method of a proton conductive membrane by synthesizing an inorganic compound in a solution containing aromatic polymer having sulfonic acid group, and then removing the solvent. In this method, oxides of silicon and phosphoric acid derivative are added to improve shapes and conditions of micropores. Japanese Patent Laid-Open Publication No. 2002-231270 suggests a method for producing an ion exchange membrane by adding a metal oxide precursor to a solution containing ion exchange resin, and then casting a liquid obtained by hydrolysis and polycondensation of the precursor. Japanese Patent Laid-Open Publication No. 2004-79378 suggests a producing method of the proton conductive membrane. First, a polymer membrane having proton conductivity is produced by a solution casting method. To produce the proton conductive membrane, the above polymer membrane is immersed in a water-soluble organic compound solution whose boiling point is not less than 100° C. to reach equilibrium swelling, and then the water is evaporated by heating. Japanese Patent Laid-Open Publication No. 2004-131530 suggests a producing method of a solid electrolyte membrane by dissolving a compound whose main component is polybenzimidazole having negative ionic group in an alcoholic solvent containing tetraalkylammonium hydroxide and whose boiling point is not less than 90° C.

As the membrane forming method, there are a melt extrusion method and a membrane casting method as well known. In the former method, the membrane is produced without using the solvent. However, the polymer is denatured due to heating, and impurities in the polymer material remains in the membrane. On the other hand, the latter method requires a large sized facility including a producing apparatus of the solution which is called a dope, a solvent recovery device and the like. However, the latter method only requires low heating temperature, and enables to remove the impurities in the polymer material. Furthermore, in the latter method, a membrane with superior flatness and smoothness is produced compared to the membrane produced by the former method.

In Japanese Patent Laid-Open Publication No. 9-320617, the solution casting method is rejected, but the problem of impurities contained in the raw material remaining in the membrane is not solved. The producing methods disclosed in Japanese Patent Laid-Open Publications No. 2001-307752, 2002-231270, 2004-79378, and 2004-131530 are for small-scale productions and not for large scale manufactures. The method disclosed in Japanese Patent Laid-Open Publication No. 2001-307752 has a problem in that dispersion of complex made of a polymer and an inorganic solvent is difficult. The method disclosed in Japanese Patent Laid-Open Publication No. 2002-231270 has a problem in that the membrane production process is complicated. In a method disclosed in Japanese Patent Laid-Open Publication No. 2004-79378 has a problem in that micropores are formed on the membrane by immersing the membrane in the water. As a result, the uniform membrane is not obtained. A method for solving the above problem is not disclosed. Further, the above reference cites that the method enables to produce various kinds of solid electrolyte membranes. However, concrete disclosure is not given. In Japanese Patent Laid-Open Publication No. 2005-146018 limits the materials to be used in the method so that other superior materials cannot be used.

None of the above references disclose a method for forming a solid electrolyte multilayer membrane which imparts desired functions to the solid electrolyte membrane.

An object of the present invention is to provide a solid electrolyte membrane with excellent proton conductivity in a continuous membrane form with the constant quality, a method and apparatus for producing the same, and the membrane electrode assembly and the fuel cell using the solid electrolyte membrane.

DISCLOSURE OF INVENTION

In order to achieve the above and other objects, in a producing method for a solid electrolyte multilayer membrane of the present invention, a layered casting membrane is formed by casting plural dopes from at least one casting die onto a moving support. Each of the plural dopes contains a solid electrolyte and an organic solvent and has different composition. The casting membrane is peeled from the support as a layered membrane containing the organic solvent. At least one of the casting membrane and the membrane is contacted with a liquid which is a poor solvent for the solid electrolyte and having a lower boiling point than that of the organic solvent. The membrane is dried to form a solid electrolyte multilayer membrane.

In the above producing method, the plural dopes are a first dope and a second dope each of which has a different combination ratio of the solid electrolyte and the organic solvent.

It is preferable to dispose a second casting die for casting the second dope downstream from a first casting die for casting the first dope.

A thickness of the solid electrolyte multilayer membrane is preferably in a range of 10 μm to 200 μm.

It is preferable that the organic solvent is a mixture of a first component which is a compound of a poor solvent of the solid electrolyte and a second component which is a compound of a good solvent of the solid electrolyte. A weight ratio of the first component with respect to a sum of weights of the first component and the second component is preferably not less than 10% and less than 100%. It is preferable that the first component contains alcohol having one to five carbons and the second component contains dimethylsulfoxide.

It is preferable that the solid electrolyte is a hydrocarbon polymer. The hydrocarbon polymer is preferably an aromatic polymer having a sulfonic acid group. The aromatic polymer is a copolymer formed of structural units represented by general formulae (I), (II) and (III) shown in chemical formula 1.

[Chemical formula 1]

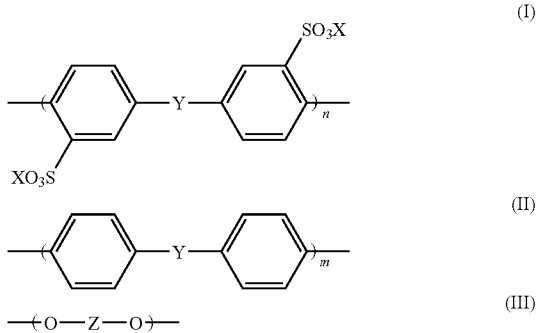

(X is H, Y is $SO_2$, Z has a structure represented in (I) or (II) in a chemical formula 2, n and m satisfy $0.1 \leq n/(m+n) \leq 0.5$)

[Chemical formula 2]

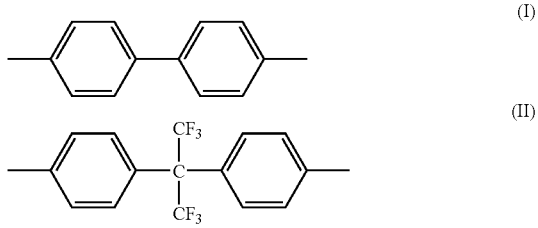

Further, present invention is constituted of the solid electrolyte membrane produced by the above producing method.

A producing apparatus of a solid electrolyte multilayer membrane is constituted of a casting device for casting plural dopes each of which containing a solid electrolyte and an organic solvent of different composition from each other from at least one casting die onto a moving support to form a layered casting membrane, a peeling device for peeling the casting membrane from the support as a layered membrane containing an organic solvent, a drying device for drying the membrane to form a solid electrolyte membrane, and a membrane wetting section for contacting a liquid which is a poor solvent of the solid electrolyte and having a lower boiling point than that of the organic solvent with at least one of the casting membrane and the membrane.

Further, the present invention includes a membrane electrode assembly constituted of the above solid electrolyte multilayer membrane, an anode electrode being adhered to one side of the solid electrolyte multilayer membrane for generating protons from hydrogen-containing substance supplied from outside, and a cathode electrode being adhered to the other side of the solid electrolyte multilayer membrane for synthesizing water from the protons passed through the solid electrolyte multilayer membrane and a gas supplied from the outside.

Further, the present invention includes a fuel cell constituted of the above membrane electrode assembly, and current collectors attached to the electrodes of the membrane electrode assembly for transmitting electrons between the anode electrode and outside and between the cathode electrode and the outside.

According to the present invention, the solid electrolyte multilayer membrane having a uniform quality and excellent ion conductivity is continuously produced. In the case the membrane electrode assembly using the solid electrolyte of the present invention is used the fuel cell, the fuel cell exerts the excellent electromotive force.

BEST MODE FOR CARRYING OUT THE INVENTION

Figure 1:
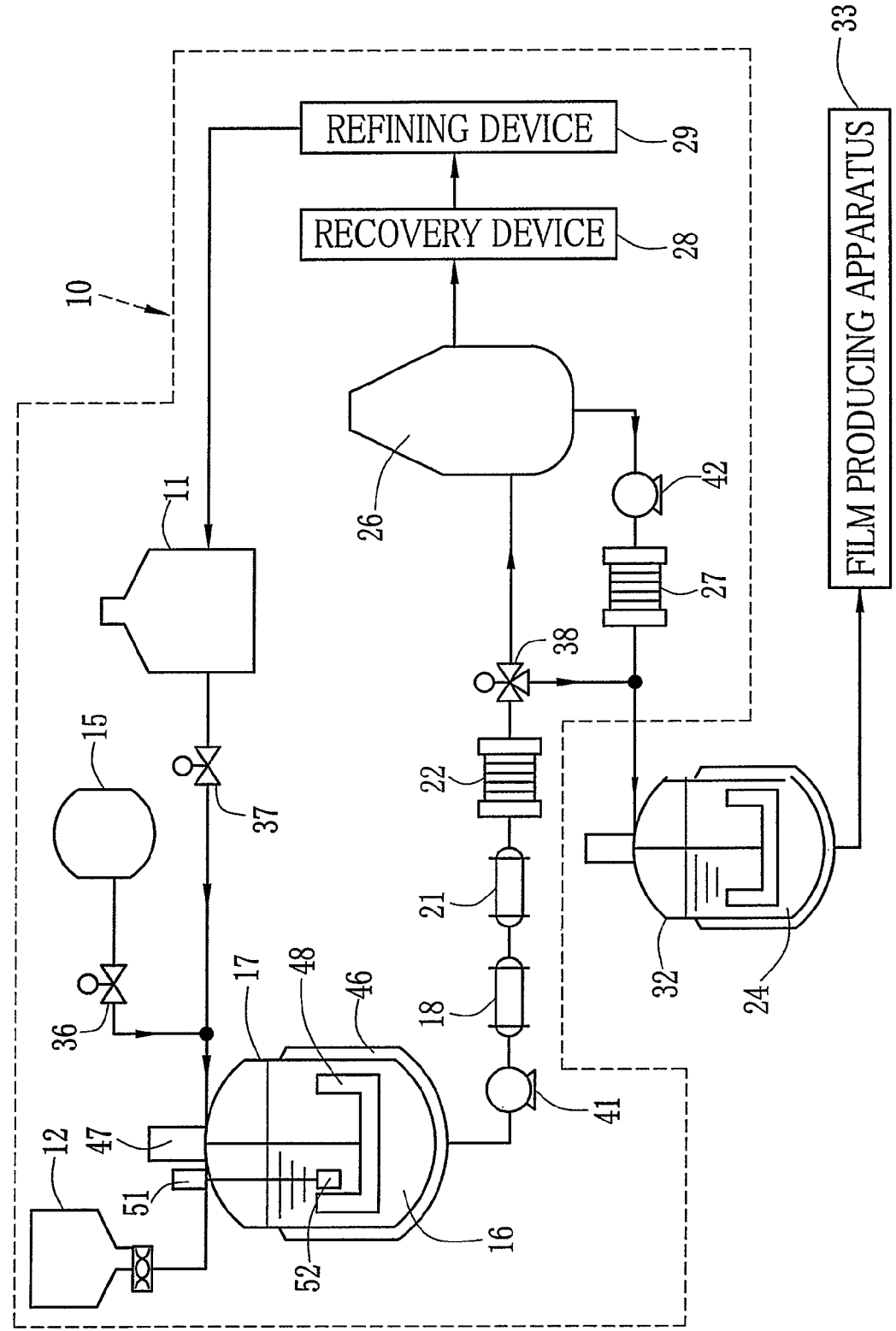
FIG. 1 is a schematic view illustrating a dope producing apparatus.

Embodiments of the present invention are described below in detail. However, the present invention is not limited to the following embodiments. First, a solid electrolyte membrane of the present invention is described. Thereafter, a producing method for the solid electrolyte membrane is described.

[Material]

In the present invention, a polymer having a proton donating group is used as a solid electrolyte to form a membrane. A method for producing the membrane will be described later. The polymer having the proton donating group is not particularly limited. Any known polymer used as the proton conductive material having the acid residue is preferably used, for instance, polymer compounds formed of addition polymerization having the sulfonic acid group in side chains, polymethacrylate having side chains of phosphoric acid groups, sulfonated poly ether ether ketone which is a sulfonated compound of poly ether ether ketone, sulfonated polybenzimidazole, sulfonated polysulfone which is a sulfonated compound of polysulfone, sulfonated compound of heat-resistant aromatic polymer compounds and so forth. As addition polymerization polymer having sulfonated acid in the side chains, there are perfluorosulfonic acid polymer such as typically Nafion (registered trademark), sulfonated polystyrene, sulfonated polyacrylonitrile-styrene, sulfonated polyacrylonitrile butadiene-styrene and the like. As sulfonated compound of the heat-resistant aromatic polymer compound, there are sulfonated polyimide and the like.

As preferable examples of the perfluorosulfonic acid, the substances disclosed in, for instance, Japanese Patent Laid-Open Publications No. 4-366137, 6-231779 and 6-342665 are used. Especially, the substance shown in Chemical formula 3 below is preferable. In the Chemical formula 3, m is in a range of 100 to 10000, preferably in a range of 200 to 5000, and more preferably in a range of 500 to 2000. In addition, n is in a range from 0.5 to 100, and especially preferable in a range of 5 to 13.5. Further, x is approximately equal to m, and y is approximately equal to n.

[Chemical formula 3]

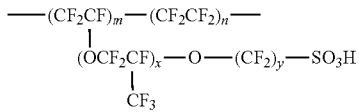

Preferable examples of sulfonated polystyrene, sulfonated polyacrylonitrile styrene and sulfonated polyacrylonitrile butadiene styrene are disclosed in Japanese Patent Laid-Open Publications No. 5-174856 and 6-111834, and the substance shown below in Chemical formula 4.

[Chemical formula 4]

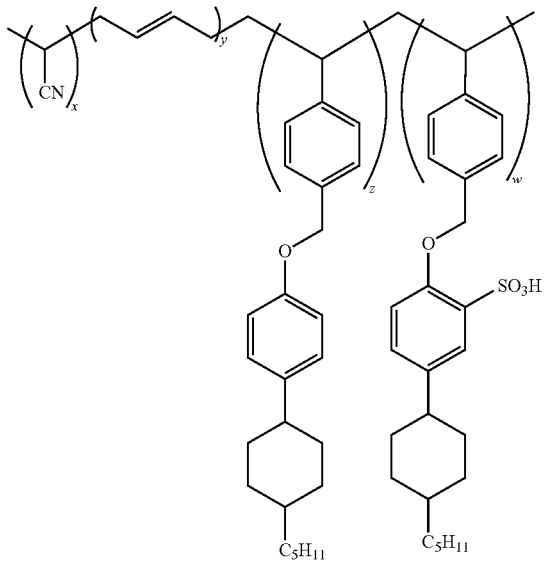

Preferable examples of the sulfonated compound of the heat-resistant aromatic polymer are disclosed in, for instance, Japanese Patent Laid-Open Publications No. 6-49302, 2004-10677, 2004-345997, 2005-15541, 2002-110174, 2003-100317, 2003-55457, 9-345818, 2003-257451 and 2002-105200, and PCT Publication No. WO/97/42253 (corresponding to Japanese Patent Publication of translated version No. 2000-510511). Among the above, the substances shown in the above Chemical formula 1, and those shown in Chemical formula 5 and Chemical formula 6 below are especially preferable.

[Chemical formula 5]

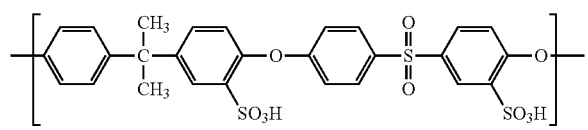

[Chemical formula 6]

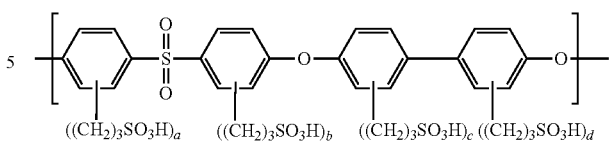

Particularly, in a membrane formed of the substance shown in the chemical formula 1, a membrane expansion coefficient by water absorption is compatible with the proton conductivity. In the case $n/(m+n)<0.1$, the amount of the sulfonic acid groups may be too low for forming a path for transporting the protons, that is, the proton channel. As a result, the obtained membrane may not exert the sufficient proton conductivity for a practical use. In the case $n/(m+n)>0.5$, the water absorption of the membrane becomes excessively higher which result in higher membrane expansion coefficient by the water absorption. As a result, the membrane is easily degraded.

The sulfonated reaction in the process for obtaining the above compounds is performed through the various synthesis methods disclosed in known references. As sulfonating agents, sulfuric acid (concentrated sulfuric acid), fuming sulfuric acid, sulfur trioxide (in a gas or liquid), sulfur trioxide complex, amidosulfuric acid, chlorosulfonic acid and the like are used. As the solvent, hydrocarbons (benzene, toluene, nitrobenzene, chlorobenzene, dioxetan or the like), halogenated alkyls (dichloromethane, trichloromethane, dichloroethane, tetrachloromethane, or the like) and the like are used. Reaction temperature is determined in a range of −20° C. to 200° C. according to activity of the sulfonating agent. In addition, it is also possible to use other methods. For instance, mercapto group, disulfide group or sulfonic acid group are previously introduced to a monomer to synthesize the sulfonated compound by oxidation with an oxidizer. As the oxidizer, hydrogen peroxide, nitric acid, bromine water, hypochlorous acid salt, hypobromite salt, potassium permanganate, chromic acid or the like are used. As the solvent, water, acetic acid, propionic acid or the like are used. The reaction temperature in the above method is determined in a range of room temperature (for instance, 25° C.) to 200° C. depending on the activity of the oxidizer. In another method, halogeno-alkyl group is previously introduced to the monomer to synthesize the sulfonated compound by substitution of sulfite salt, hydrogen sulfite salt or the like. As the solvent, water, alcohol, amide, sulfoxide, sulfone or the like are used. The reaction temperature is determined in a range of the room temperature (for instance 25° C.) to 200° C. It is also possible to use a mixture of two or more solvents as the solvent for the above sulfonation reaction.

Further, it is also possible to use alkyl sulfonating agent in the reaction process to produce the sulfonated compounds. One of the common methods is Friedel-Crafts Reaction (see Journal of Applied Polymer Science, Vol. 36, 1753-1767, 1988) using sulfone and $AlCl_3$. When the alkyl sulfonating agent is used to carry out the Friedel-Crafts Reaction, the following substances are usable as the solvent: hydrocarbon (benzene, toluene, nitrobenzene, acetophenon, chlorobenzen, trichlorobenzene or the like), alkyl halide (dichloromethane, trichloromethane, dichloroethane, tetrachloromethane, trichloroethane, tetrachloroethane or the like) or the like. The reaction temperature is determined in a range of the room temperature to 200° C. It is also possible to use the mixture of two or more solvents.

To produce the solid electrolyte membrane having the structure of the chemical formula 1, a dope is prepared containing a polymer whose X in the chemical formula 1 is cation species other than a hydrogen atom H (hereinafter referred to as a precursor). The dope is cast onto a support and then peeled off as a membrane containing the precursor (hereinafter referred to as a precursor membrane). By substituting the hydrogen atom H for X in the precursor membrane, that is, the proton substitution, it becomes possible to produce the solid electrolyte membrane constituted of the polymer having the structure shown in the chemical formula 1.

The cation species is an atom or an atomic group which generates cation(s) at the time of ionization. The ion generated from the cation species may have a valence of one or more. As the cation, alkali-metal cation, alkali earth metal cation and ammonium cation are preferable in addition to proton, and calcium ion, barium ion, quaternary ammonium ion, lithium ion, sodium ion, potassium ion are more preferable. The membrane obtains the function as the solid electrolyte even if the substitution of the hydrogen atom H for the cation species X in the chemical formula 1 is not performed. However, the proton conductivity of the membrane increases as the percentage of the substitution of the hydrogen atom H for X (the cation species) increases. For that reason, it is especially preferable that X is the hydrogen atom H.

It is preferable to use the solid electrolyte having the following properties. The proton conductivity is preferably not less than 0.005 S/cm and more preferably not less than 0.01 S/cm at the temperature of, for instance, 25° C., and the relative humidity of, for instance, 70%. Further, the proton conductivity after immersing the membrane in 50% aqueous methanol solution for one day at the temperature of 18° C. is preferably not less than 0.003 S/cm, and more preferably not less than 0.008 S/cm. In particular, it is preferable that a percentage of reduction in the proton conductivity of the membrane after the immersion compared to that before the immersion is not more than 20%. Methanol diffusivity is preferably not more than $4 \times 10^{-7}$ cm$^2$/sec, and especially preferably not more than $2 \times 10^{-7}$ cm$^2$/sec.

As the strength of the membrane, elastic modulus is preferably not less than 10 MPa, and more preferably not less than 20 MPa. Measuring methods of the elastic modulus are disclosed in a paragraph [0138] of Japanese Patent Laid-Open Publication No. 2005-104148. The above preferable values are obtained by using a tensile testing device produced by Toyo Baldwin Co. Ltd. If other measuring method and/or other tensile testing device are used, correlation between the obtained value and the reference value obtained by using the above tensile testing device should be previously calculated.

As the durability, between before and after a test with time in which the membrane is immersed in 50% methanol at a constant temperature, a percentage of a change in each of weight, ion exchange capacity, and methanol diffusivity is preferably not more than 20%, and more preferably not more than 15%. Further, in a test with time in hydrogen peroxide, the percentage of the change in each of the weight, the ion exchange capacity and the methanol diffusivity is preferably not more than 20%, and more preferably not more than 10%. The volume swelling ratio of the membrane in 50% methanol at the constant temperature is preferably not more than 10% and more preferably not more than 5%.

The membrane with stable water absorption ratio and stable moisture content is preferable. It is preferable that the membrane has extremely low solubility in the alcohols, water, or mixture of alcohol and water to the extent that it is practically negligible. It is also preferable that the decrease of the membrane weight and changes in shapes and conditions of the membrane when the membrane is immersed in the above liquid is extremely small to the extent that it is practically negligible.

The ion conductivity property of the solid electrolyte membrane is represented by an index which is a ratio of the ion conductivity to the methanol transmission coefficient. The higher the index in a certain direction, the higher the ion conductive property becomes in such direction. In the thickness direction of the solid electrolyte membrane, the ion conductivity increases proportional to the thickness while the methanol permeability increases inversely proportional thereto. Accordingly, the ion conductive property of the solid electrolyte membrane is controlled by changing the thickness. In the solid electrolyte membrane used for the fuel cells, since the anode is provided on one side of the solid electrolyte membrane and the cathode is provided on the other side thereof, it is preferable that the index in the membrane thickness direction is larger than that in other directions. The thickness of the solid electrolyte membrane is preferably in a range of 10 μm and 300 μm. If, for instance, both the ion conductivity and the methanol diffusion coefficient are high in the solid electrolyte, it is especially preferable to produce the membrane with a thickness of 50 μm-200 μm. If, for instance, both the ion conductivity and the methanol diffusion coefficient are low in the solid electrolyte, it is especially preferable to produce the membrane with a thickness of 20 μm-100 μm.

Heat resistant temperature is preferably not less than 200° C., more preferably not less than 250° C. and especially preferably not less than 300° C. The heat resistant temperature means the temperature at which a decrease in the membrane weight reaches 5% when the heat is increased at the measure of 1° C./min. The decrease in the membrane weight does not include an amount of moisture and the like evaporated from the membrane.

When the solid electrolyte is formed in the membrane form and used for the fuel cell, the maximum power density thereof is preferably not less than 10 mW/cm$^2$.

By using the above-mentioned solid electrolyte, a solution suitable for the membrane production is produced, and accordingly, the solid electrolyte membrane suitable for producing the fuel cell is produced. The solution suitable for the membrane production is, for instance, a solution whose viscosity is relatively low, and from which foreign matters are easily removed through filtration. The obtained solution is referred to as a dope in the following descriptions.

As the solvent for the dope, an organic solvent in which the polymer, that is, the solid electrolyte is dissolved is used. For instance, aromatic hydrocarbon (for instance, benzene, toluene and the like), halogenated hydrocarbon (for instance, dichloromethane, chlorobenzene and the like), alcohol (for instance, methanol, ethanol, n-propanol, n-butanol, diethylene glycol and the like), ketone (for instance, acetone, methyl ethyl ketone, and the like), ester (for instance, methyl acetate, ethyl acetate, propyl acetate and the like), ether (for instance, tetrahydrofuran, ethylene glycol monomethyl ether), and compounds containing nitrogen (N-methylpyrrolidone, N,N-dimethylformamide (DMF), N,N'-dimethylacetamide (DMAc) and the like), dimethyl surfoxide (DMSO) and the like.

As the solvent of the dope, it is also possible to use a mixture in which plural substances are mixed. When the mixture is used as the solvent, it is preferable to mix the good solvent and the poor solvent of the solid electrolyte. If the proton substitution is carried out in a production of the solid electrolyte membrane having the structure shown in the Chemical formula 1, it is preferable to use a good solvent and a poor solvent of the precursor of the solid electrolyte. The solvent and the solid electrolyte are mixed such that the solid electrolyte constitutes 5 wt. % of the whole weight. Whether the solvent used is the poor solvent or the good solvent of the solid electrolyte is determined by the amount of the insoluble residues. The good solvent of the solid electrolyte in which the solid electrolyte is dissolved has a relatively high boiling point compared to the commonly used compounds. On the other hand, the poor solvent has a relatively low boiling points compared to the commonly used compounds. Accordingly, by mixing the poor solvent to the good solvent, the boiling point of the mixture in which the solid electrolyte is dissolved is lowered. As a result, efficiency and effect in removing the solvent during the membrane production process is improved. In particular, the drying efficiency of the casting membrane is significantly improved.

In the mixture of the good solvent and the poor solvent, larger weight ratio of the poor solvent is preferable, concretely, not less than 10% and less than 100% is preferable, and more preferably (weight of the good solvent):(weight of the poor solvent) is in a range of 90:10 to 10:90. Thereby, the percentage of the component with the low boiling point increases in the total weight of the solvents. Accordingly, the drying efficiency and the drying effects are further improved during the producing process of the solid electrolyte membrane.

As the good solvent, DMF, DMAc, DMSO and NMP are preferable. Among the above, DMSO is especially preferable in terms of safety and relatively low boiling point. As the poor solvent, lower alcohol having 1 to 5 carbons, methyl acetate and acetone are preferable. Among the above, the lower alcohol having 1 to 3 carbons are more preferable. If the DMSO is used as the good solvent, methyl alcohol is especially preferable in terms of excellent solubility in the DMSO.

To improve various membrane properties of the solid electrolyte membrane, additives are added to the dope. As the additives, antioxidant agents, fibers, fine particles, water absorbing agents, plasticizers, solubilizers and the like are used. A ratio of the additives is preferably in a range of 1 wt. % to 30 wt. % when the whole solid component in the dope is 100 wt. %. The additives and its mixing ratio should not adversely affect the proton conductivity. The additives will be described in the following.

As the antioxidant agent, for instance, compounds such as hindered phenols, monovalent or divalent sulfers, trivalent phosphates, benzophenones, bonzotriazoles, hindered amines, cyanoacrylates, sallicylates and oxalic acid anillides are preferably used. In particular, compounds disclosed in Japanese Patent Laid-Open Publications No. 8-53614, 10-101873, 11-114430 and 2003-151346 are preferably used.

As the fibers, for instance, perfluorocarbon fibers, cellulose fibers, glass fibers and polyethylene fibers are preferably used. In specific, the fibers disclosed in Japanese Patent Laid-Open Publications No. 10-312815, 2000-231938, 2001-307545, 2003-317748, 2004-63430 and 2004-107461 are used.

As the fine particles, for instance, titanium oxide, zirconium oxide and the like are preferably used. In specific, the fine particles disclosed in Japanese Patent Laid-Open Publications No. 2003-178777 and 2004-217931 are preferably used.

As the water absorbers, that is, the hydrophilic substances, for instance, cross-linked polyacrylate salt, starch-acrylate salt, poval (polyvinyl alcohol), polyacrylonitrile, carboxymethylcellulose, polyvinylpyrrolidone, polyglycoldialkylether, polyglycoldialkylesther, synthetic zeolite, titania gel, zirconia gel, and yttria gel are preferably used. In specific, the water absorbers disclosed in Japanese Patent Laid-Open Publications No. 7-135003, 8-20716 and 9-351857 are preferably used.

As the plasticizer, for instance, phosphoric acid ester compound, chlorinated paraffin, alkylnaphthalene type compound, sulfone alkylamide compound, oligo ether, and aromatic nitrile are preferably used. In specific, the plasticizers disclosed in Japanese Patent Laid-Open Publications No. 2003-288916 and 2003-317539 are preferably used.

As the solubilizers, substances whose boiling points or sublimation points are not less than 250° C. are preferable, and those not less than 300° C. are more preferable.

It is also possible to add various polymers to the dope for following objectives: (1) to enhance the mechanical strength and (2) to increase the acid concentration in the membrane.

A polymer whose molecular weight is approximately in a range of 10000 to 1000000 and soluble to the solid electrolyte is suitable to achieve the above objective (1). For instance, perfluoropolymer, polystyrene, polyethyleneglycol, polyoxetane, polyether ketone, polyether sulfone, and the polymers containing two or more structural repeating units of the above polymers are preferable. It is also possible to improve the solubility of the above polymer in the solid electrolyte by adding the solubilizer. As the solubilizer, the substance with the boiling point or the sublimation point of not less than 250° C. is preferable, and that not less than 300° C. is more preferable.

A polymer having proton acid segment and the like is preferable to achieve the above objective (2). As such polymer, for instance, perfluorosulfone acid polymer such as Nafion (registered trademark), sulfonated polyether ether ketone having phosphoric acid in the side chain, sulfonated heat-resistant aromatic polymer compounds such as sulfonated poly ether sulfone, sulfonated polysulfone, sulfonated polybenzimidazole and the like are used. Further, it is preferable to add the above substances to the dope in a range of 1 wt. % to 30 wt. % to the whole weight of the membrane.

When the obtained solid electrolyte membrane is used for the fuel cell, it is possible to add an active metal catalyst to the dope for promoting redox reaction of the anode fuel and the cathode fuel. Since the fuel permeated into the solid electrolyte from one of the electrodes is consumed therein without reaching the other electrode, the crossover phenomenon is prevented. Active metal catalyst is not particularly limited as long as it functions as the catalyst for the electrodes. However, platinum or platinum based alloy is especially suitable.

[Dope Production]

FIG. 1 illustrates a dope producing apparatus 10. The present invention is not limited to the following method and apparatus for producing the dope. The dope producing apparatus 10 is constituted of a solvent tank 11, a hopper 12, an additive tank 15, a mixing tank 17, a heating device 18, a temperature controlling device 21, a filtration device 22, a flash device 26, and a filtration device 27. The solvent tank 11 stores the solvent. The hopper 12 supplies a solid electrolyte. The additive tank 15 stores the additive. The mixing tank 17 mixes the solvent, the solid electrolyte and the additive to form a liquid mixture 16. The heating device 18 heats the liquid mixture 16. The temperature controlling device 21 controls the temperature of the heated liquid mixture 16. Thereafter, the filtration device 22 filters the liquid mixture 16. After the filtration, the flash device 26 controls the concentration of the dope 24. Then the filtration device 27 filters the dope 24. The dope producing apparatus 10 further includes a recovery device 28 and a refining device 29. The recovery device 28 recovers the solvent. The refining device 29 refines the recovered solvent. The dope producing apparatus 10 is connected to a membrane producing apparatus 33 via a stock tank 32. Valves 36 to 38 for controlling a liquid feeding amount, and pumps 41 and 42 for feeding the liquid are provided in the dope producing apparatus 10. The positions and the number of the valves and the pumps are properly changed.

The dope 24 is produced in the following method when the dope producing apparatus 10 is used. First, the valve 37 is opened to feed a solvent from the solvent tank 11 to the mixing tank 17. Next, the solid electrolyte in the hopper 12 is fed to the mixing tank 17. The solid electrolyte may be continuously fed to the mixing tank 17 through a supplying device which continuously measures and supplies the solid electrolyte, or intermittently fed to the mixing tank 17 through a supplying device which measures and supplies the solid electrolyte by a predetermined amount. Further, the valve 36 is adjusted to feed a necessary amount of additive solution from the additive tank 15 to the mixing tank 17.

Other than feeding the additive in the form of solution, for instance, in the case the additive is liquid at the room temperature, the additive can be fed to the mixing tank 17 in the liquid form. Further, in the case the additive is solid, it is possible to use the hopper 12 to feed the additive to the mixing tank 17. To add several additives, it is possible to dissolve several additives in a solution and put the solution in the additive tank 15. It is also possible to use plural additive tanks. Each of the additive tanks is filled with the solution containing a different additive. Each solution may be separately fed to the mixing tank 17 through a pipe independent from each other.

In the above description, the solvent, the solid electrolyte and the additive are put into the mixing tank 17 in this order; however, the order is not limited to the above. For instance, a preferable amount of the solvent is fed to the mixing tank 17 after feeding the solid electrolyte to the mixing tank 17. Further, it is not necessary to mix the additive in the mixing tank 13 together with the solid electrolyte and the solvent. The additive may be mixed to the mixture of the solid electrolyte and the solvent by using an inline-mixing method in a later process.

A jacket 46, a first stirrer 48 rotated by a motor 47 and a second stirrer 52 rotated by a motor 51 are preferably attached to the mixing tank 17. The jacket 46 wraps around the mixing tank 17 to supply a heat transfer medium in a space between the mixing tank 17 and the jacket 46. The temperature of the mixing tank 17 is controlled by the heat transfer medium flowing in the space between the tank 17 and the jacket 46. A preferable temperature range of the mixing tank 17 is from −10° C. to 55° C. The liquid mixture 16, in which the solid electrolyte is swelled in the solvent, is obtained by properly selecting and rotating the first and second stirrers 48, 52. It is preferable that the first stirrer 48 has an anchor blade, and the second stirrer 52 has an eccentric stirrer of a dissolver type.

Next, the liquid mixture 16 is transported to the heating device 18 through the pump 41. It is preferable that a pipe through which the liquid mixture 16 passes in the heating device 18 is provided with the jacket. The heat transfer medium passes through a space between the pipe and the jacket. Further, the heating device 18 preferably has a pressurizing section (not shown) to apply pressure to the liquid mixture 16. Thereby, the solid electrolyte in the liquid mixture 16 is dissolved effectively and efficiently while the liquid mixture 16 is heated and/or pressurized. Hereinafter, the method for dissolving the solid electrolyte in the solvent by heating is referred to as a heat dissolution method. In the heat dissolution method, the liquid mixture 16 is preferably heated to reach the temperature in a range of 60° C. to 250° C.

Instead of the heat-dissolution method, a cooling-dissolution method is possibly used for dissolving the solid electrolyte in the solvent. In the cooling dissolution method, the liquid mixture 16 is preferably cooled in a range of −100° C. to −10° C. It becomes possible to sufficiently dissolve the solid electrolyte contained in the liquid mixture 16 in the solvent by properly selecting one of the heat-dissolving method and the cooling-dissolving method.

The temperature of the liquid mixture 16 is adjusted by the temperature control device 21 to reach the room temperature. Thereafter, the liquid mixture 16 is filtered through the filtration device 22 to remove the foreign matters such as the impurities and the agglomeration. Hereinafter the liquid mixture 16 is referred to as the dope 24. An average pore diameter of the filter of the filtration device 22 is preferably 50 μm or less.

After the filtration, the dope 24 is transported to the stock tank 32 through the valve 38 and temporarily stored, and then used for producing the membrane.

However, a method, in which the solid electrolyte is swelled and then dissolved into the solvent, requires a longer time as the concentration of the solid electrolyte increases, which reduces the production efficiency. In such case, it is preferable to prepare the dope with the lower concentration of the solid electrolyte, and then to carry out a concentration process to obtain the intended concentration. For instance, the dope 24 filtered through the filtration device 22 is transported to the flash device 26 through the valve 38, and a part of the solvent contained in the dope 24 is evaporated to concentrate the dope 24. The concentrated dope 24 is transported from the flash device 26 to the filtration device 27 through the pump 42. At the filtration, the temperature of the dope 24 is preferably from 0° C. to 200° C. The impurities of the dope 24 are removed through the filtration device 27. Thereafter, the dope 24 is transported to and temporarily stored in the stock tank 32, and then used for the membrane production. Note that the foams may be formed in the concentrated dope 24. It is preferable to perform processing to remove the foams prior to transporting the concentrated dope 24 to the filtration device 27. It is possible to apply known methods, for instance, an ultrasonic irradiation method in which the ultrasound is irradiated to the dope 24 for removing the foams.

Further, the solvent vapor generated by the flash evaporation in the flash device 26 is condensed to liquid and recovered by the recovery device 28 having a condenser (not shown). The recovered solvent is refined as the solvent to be used for the dope production in the refining device 29 and reused. Such recovery and refining are advantageous to reduce production cost and also prevent adversely affecting human health and environment by virtue of the closed system.

By using the above methods, the dope 24 whose concentration of the solid electrolyte or that of the precursor is in a range of not less than 5 wt. % and not more than 50 wt. % is produced. The concentration of the solid electrolyte or that of the precursor is more preferably in a range of not less than 10 wt. % and not more than 40 wt. %. Further, the concentration of the additive is preferably in a range of not less than 1 wt. % and not more than 30 wt. % when the whole solids contained in the dope 24 is considered to be 100 wt. %.

[Membrane Production]

Figure 2:
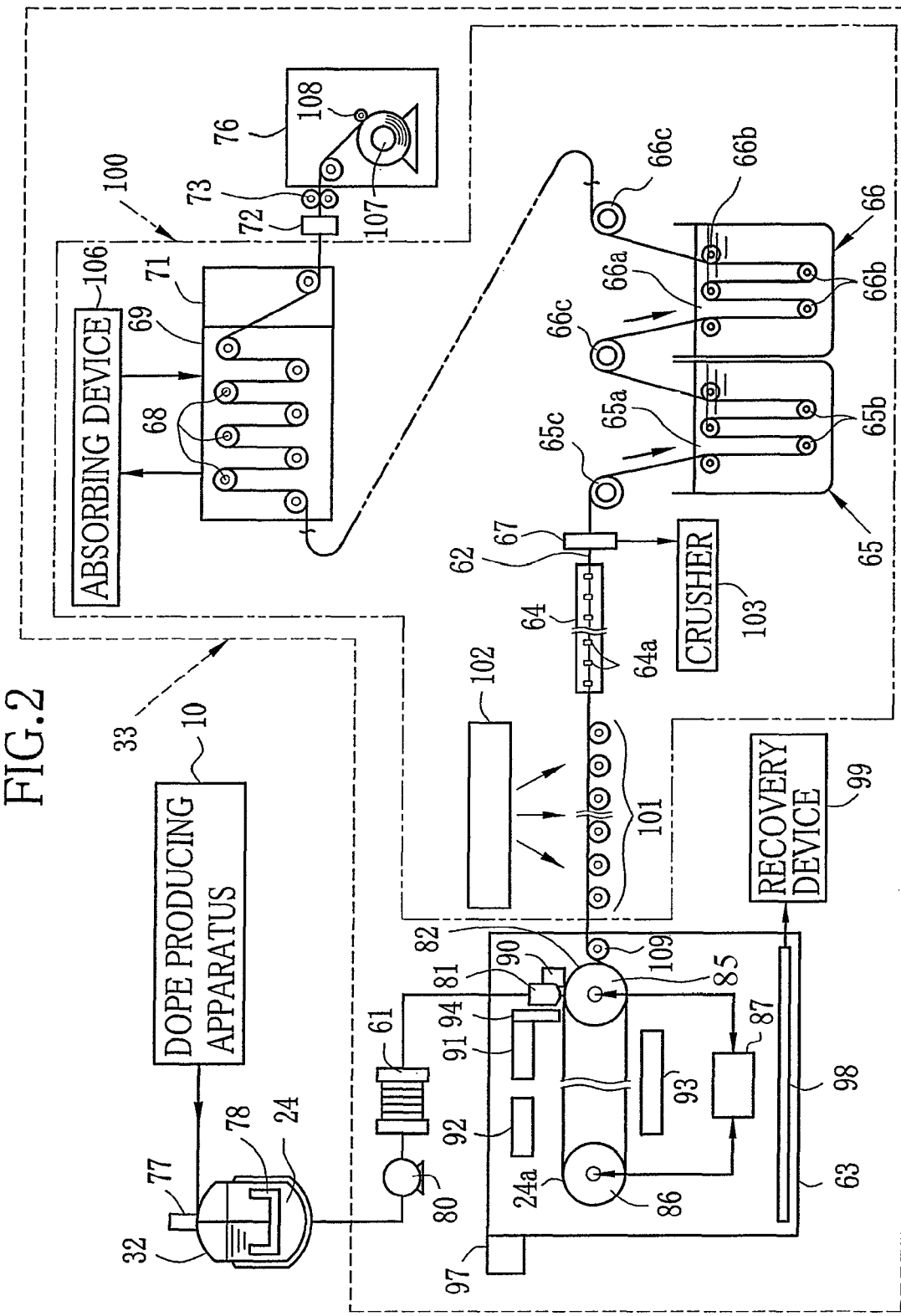
FIG. 2 is a schematic view illustrating a membrane producing apparatus.

Hereinafter the method for producing the solid electrolyte membrane is described. FIG. 2 is a schematic view illustrating a membrane producing apparatus 33. The present invention is not limited to the following methods and apparatuses for producing the solid electrolyte membrane. The membrane producing apparatus 33 is provided with a filtration device 61, a casting chamber 63, a tenter device 64, an edge slitting device 67, a first liquid bath 65, a second liquid bath 66, a drying chamber 69, a cooling chamber 71, a neutralization device 72, a knurling roller pair 73 and a winding device 76. The filtration device 61 removes the impurities from the dope 24 transported from the stock tank 32. Thereafter, from the casting chamber 63, the dope 24 is cast to form a solid electrolyte membrane (hereinafter referred to as a membrane) 62. The tenter device 64 dries the membrane 62 while holding the both side edges of the membrane 62. The edge slitting device 67 cuts off the side edges of the membrane 62. Then, the membrane 62 is immersed in the first liquid bath 65 and the second liquid bath 66. In the drying chamber 69, the membrane 62 is bridged across plural rollers 68 and dried while the membrane 62 is being transported by the rollers 68. In the cooling chamber 71, the membrane 62 is cooled. The neutralization device 72 reduces the charged voltage of the membrane 62. The nurling roller pair 73 embosses the side edges of the membrane 62. The winding device 76 winds the membrane 62.

A stirrer 78 rotated by a motor 77 is provided in the stock tank 32. By using the stirrer 78, precipitation and agglomeration of the solids in the dope 24 are prevented. The stock tank 32 is connected to the filtration device 61 through a pump 80. The average diameter of the filter used in the filtration device 61 is preferably 10 μm or less. Thereby, impurities causing degradation of initial performance of proton conductivity and degradation of proton conductivity with time are prevented from being mixed into the dope 24. Note that impurities such as insoluble contents are visually identified by emitting light from a fluorescent lamp to a sample dope taken from the stock tank 32.

The casting chamber 63 is provided with a casting die 81 for casting the dope 24, and a belt 82 which is a support being transported. A precipitation hardened stainless steel is preferable for the material of the casting die 81. The material preferably has a coefficient of thermal expansion at most $2 \times 10^{-5}$ (° C.$^{-1}$). Further, the material with the almost same anti-corrosion properties as SUS316 in corrosion examination in electrolyte solution can also be used. Further, the material has the anti-corrosion properties which do not form pitting (holes) on the gas-liquid interface after having been dipped in a liquid mixture of dichloromethane, methanol and water for three months. Further, it is preferable to manufacture the casting die 81 by grinding the material which passed more than a month after casting. Thereby, the dope 24 flows inside the casting die 81 uniformly. Accordingly, streaks and the like in a casting membrane 24a are prevented, as will be described later. It is preferable that the finish precision of a contacting surface of the casting die 81 to the dope 24 is 1 μm or less of the surface roughness and the straightness is 1 μm/m or less in any direction. Clearance of the slit of the casting die 81 is automatically controlled in a range of 0.5 mm to 3.5 mm. A portion of the lip end of the casting die 81 contacting the dope is processed so as to have a constant chamfered radius R at 50 μm or less throughout the width of the casting die 81. Preferably, the casting die 81 is of a coat-hanger type.

A width of the casting die 81 is not limited. However, the width of the casting die 81 is preferably in a range between 1.1 times and 2.0 times larger than a width of the membrane as an end product. Further, it is preferable to install a temperature controlling device 21 to the casting die 81 for maintaining a predetermined temperature of the dope 24 during the production of the membrane. Further, the casting die 81 is preferably provided with bolts (heat bolts) at predetermined intervals in the width direction of the casting die 81 for adjusting the thickness of the membrane, and an automatic thickness control mechanism which adjusts clearance of the slit by using the heat bolts. In the membrane production process, it is preferable to set a profile according to the flow volume of the pump 80 based on the previously set program. To accurately control the amount of the dope to be transported, the pump 80 is preferably a high-precision gear pump. Further, in the membrane producing apparatus 33, it is also possible to carry out a feedback control based on an adjustment program according to a profile of a thickness gauge, for instance, an infrared thickness gauge (not shown). The casting die 81 whose slit opening of the lip end is adjustable within a range of ±50 μm is preferably used so as to maintain a difference in the thickness between two arbitrary positions on the membrane 62 not more than 1 μm except for the side edges of the membrane 62 as the end product.

It is more preferable that lip ends of the casting die 81 are provided with a hardened layer. Methods for forming the hardened layer are not particularly limited. For instance, there are methods such as ceramic coating, hard chrome plating, and nitriding treatment. If the ceramic is used as the hardened layer, the ceramic which is grindable but not friable, with a lower porosity and the good corrosion resistance is preferred. The ceramic without affinity for and adherence to the casting die 30 is preferable. For instance, as the ceramic, tungsten carbide, $Al_2O_3$, TiN, $Cr_2O_3$ and the like can be used, and especially tungsten carbide (WC) is preferable. A WC coating is performed in a thermal spraying method.

The dope discharged to the lip end of the casting die 81 is partially dried and becomes solid. In order to prevent such solidification of the dope, a solvent supplying device (not shown) for supplying the solvent to the lip end is preferably disposed in the proximity of the lip end. The solvent is preferably supplied in a peripheral area of a three-phase contact line on which the lip ends contacts with the casting bead and the outside air. It is preferable to supply the solvent in a range from 0.1 mL/min to 1.0 mL/min to each of the bead edges so as to prevent the foreign matters such as impurities precipitated from the dope or those outside the dope from being mixed in the casting membrane 24a. It is preferable to use a pump with a pulsation of 5% or less for supplying the solvent.

The belt 82 below the casting die 81 is bridged across the rollers 85 and 86, and is continuously transported by the driving and rotating of at least one of the rollers 85, 86.

The width of the belt 82 is not particularly limited. However, the width is preferably in a range of 1.1 times to 2.0 times larger than the casting width of the dope 24. Further, the length of the belt 82 is preferably 20 m-200 m. The thickness of the belt 82 is preferably 0.5 mm-2.5 mm. Further the belt 82 is preferably polished such that the surface roughness is 0.05 μm or less.

Material of the belt 82 is not particularly limited. However, it is preferable to use a plastic film which is insoluble to the organic solvent in the dope 24. The material of the plastic film is preferably nonwoven plastic fabric made of polyethylene terephthalate (PET) film, polybutylene terephthalate (PBT) film, nylon 6 film, nylon 6, 6 film, polypropylene film, polycarbonate film, polyimide film and the like. The belt 82 of a long length is preferable. It is preferable that the belt 82 has chemical stability against the solvent used. It is also preferable that the belt 82 is heat-resistant to endure the temperature during the membrane production. Note that it is also possible to use a stainless support with the long length.

In order to keep surface temperatures of the rollers 85, 86 at predetermined values, it is preferable to attach a heat transfer medium circulating device 87 to each of the rollers 85 and 86. In this embodiment, a passage (not shown) for the heat transfer medium is formed in each of the rollers 85 and 86. The temperatures of the rollers 85 and 86 are kept at the predetermined values by passing the heat transfer media kept at the predetermined temperatures through the passages. The surface temperature of the belt 82 is properly set according to the type of the solvent, the type of the solid component, the concentration of the dope and so forth.

Instead of the rollers 85, 86 and the belt 82, it is also possible to use a casting drum (not shown) as the support. In this case, it is preferable that the casting rotates with a high precision such that the variation in the rotation speed is 0.2% or less. It is preferable that the polishing is made such that a surface roughness is 0.01 μm or less. It is preferable that the surface of the casting is hard chrome-plated which offers sufficient corrosion resistance and hardness. It is preferable to minimize the surface defect of the casting drum, the belt 82 and the rotation rollers 85, 86. Concretely, the number of pin holes whose diameter is 30 μm or more is preferably zero. The number of pinholes whose diameter is not less than 10 μm and less than 30 μm is preferably 1 or less per 1 m$^2$. The number of pinholes whose diameter is less than 10 μm is preferably 2 or less per 1 m$^2$.

Further, a decompression chamber 90 is preferably provided in the proximity of the casting die 81 for adjusting the pressure in the upstream area from the casting bead in the support moving direction. The casting bead is formed between the casting die 81 and the belt 82.

In the proximity of the belt 82, air blowers 91-93 and an air shielding plate 94 are provided. The air blowers 91-93 blow air onto the casting membrane 24a to evaporate the solvent. The air shielding plate 94 prevents the air which may damage the surface of the casting membrane 24a from blowing onto the casting membrane 24a.

In the casting chamber 63, a temperature controlling device 97 and a condenser 98 are provided. The temperature controlling device 97 keeps the temperature inside the casting chamber 63 at the predetermined value. The condenser 98 condenses and recovers the solvent vapor. A recovery device 99 is provided outside the casting chamber 63. The recovery device 99 recovers the condensed and liquefied organic solvent.

An area indicated by a short dashed line in FIG. 2, that is, the area from the downstream from the casting chamber 63 to the cooling chamber 71 is a drying area 100 for drying the membrane 62. A transporting section 101 is provided downstream from the casting chamber 63. In the transporting section, an air blower 102 is provided for blowing dry air onto the membrane 62. The membrane 62 passed through the transporting section 101 is transported to the tenter device 64 in which the membrane 62 is stretched in the width direction while both side edges are held by membrane holding members such as clips 64a or pins. The dry air is introduced to the tenter device 64 to dry the membrane 62. Note that it is preferable to separate inside the tenter device 64 into different temperature zones to adjust the drying conditions. After passing the tenter device 64, the membrane 62 is transported to the edge slitting device 67. In the edge slitting device 67, a crusher 103 is provided for crushing the side edges cut off from the membrane 62 into chips.

The membrane 62 whose side edges are cut off and removed is transported to the first and second liquid baths 65 and 66 through guide rollers 65b, 65c, 66b and 66c. A first liquid 65a is put in the first liquid bath 65. As the first liquid 65a, a liquid soluble to and having a lower boiling point than the solvent of the dope 24 and in which the polymer is insoluble is used. It is possible to use a liquid mixture containing liquids other than the above liquid. It is preferable that the temperature of the first liquid 65a in the first liquid bath 65 is adjustable in a range of 10° C.-150° C.

A second liquid 66a is put in the second liquid bath 66. As the second liquid 66a, a similar liquid to the first liquid 65a is used. It is also possible to use the liquid mixture in the same manner as the first liquid 65a. In addition, as the second liquid 66a, it is preferable to use the liquid whose boiling point is lower than that of the first liquid 65a. It is preferable that the temperature of the second liquid 66a in the second liquid bath 66 is adjustable in a range of 10° C.-150° C. Positions of the first and second liquid baths 65, 66 are not particularly limited. In the case where the first and the second liquid baths 65 and 66 are disposed at positions other than those immediately before the drying chamber 69 of a drying area 100, it is possible to dispose a drying chamber or the like for drying the membrane 62 at a position, for instance, immediately after the second liquid bath 66.

In the drying chamber 69, an absorbing device 106 is provided. The absorbing device 106 absorbs and recovers the solvent vapor evaporated from the membrane 62. In FIG. 2, a cooling chamber 71 is provided downstream from the drying chamber 69. It is also possible to provide a humidification chamber (not shown) between the drying chamber 69 and the cooling chamber 71. The humidification chamber adjusts the moisture content in the membrane 62. The neutralization device 72 is a neutralization bar or the like which controls the charged voltage of the membrane 62 in a predetermined range (for instance from −3 kV to +3 kV). The neutralization device 72 is disposed downstream from the cooling device 71 as an example. The position of the neutralization device 72 is not limited to that illustrated in FIG. 2. The knurling roller pair 73 embosses the both side edges of the membrane 62. Inside the winding device 76, a winding roll 107 and a press roller 108 are provided. The winding roll 107 winds up the membrane 62. The press roller 108 controls the tension of the membrane 62 at the time of winding.

Next, an example of a method for producing the membrane 62 using the membrane producing apparatus 33 is described in the following. The dope 24 is kept uniform by the rotation of the stirrer 78. It is possible to add various additives to the dope 24 while the dope 24 is being stirred.

The dope 24 is transported to the stock tank 32. Until the casting of the dope 24, the precipitation and the agglomeration of the solids are prevented by stirring the dope 24. Then, the dope 24 is filtered through the filtration device 61 so as to remove the foreign matters whose particle size is larger than a predetermined size and those in a gel-form.

Then the dope 24 is cast onto the belt 82 from the casting die 81. It is preferable that the rollers 85 and 86 are driven so as to adjust the tension of the belt 82 in a range of 10$^3$ N/m and 10$^6$ N/m. It is preferable to adjust the relative positions of the rollers 85 and 86 or the rotation speed of at least one of the rollers 85 and 86. Moreover, a relative speed difference between the belt 82 and the rollers 85 and 86 are adjusted to be 0.01 m/min or less. Preferably, speed fluctuation of the belt 82 is 0.5% or less, and meandering thereof caused in a width direction while the belt 82 makes one rotation is 1.5 mm or less. In order to control the meandering, it is more preferable to provide a detector (not shown) and a position controller (not shown) to perform feedback control of the position of the belt 82. The detector detects the positions of both sides of the belt 82. The position controller adjusts the position of the belt 82 according to a measurement value of the detector. With respect to a portion of the belt 82 located directly below the casting die 81, it is preferable that vertical positional fluctuation caused in association with the rotation of the belt 82 is adjusted to be 200 μm or less. Further, it is preferable that the temperature in the casting chamber 63 is adjusted within a range of −10° C. to 57° C. by the temperature controlling device 97. The solvent vapor in the casting chamber 63 is collected by the recovery device 99 and is recycled and reused as the dope for preparing the solvent.

The casting bead is formed between the casting die 81 and the belt 82, and the casting membrane 24a is formed on the belt 82. In order to stabilize the casting bead, it is preferable that the upstream area from the casting bead in the transporting direction of the casting die 81 is decompressed by the decompression chamber 90 to achieve a predetermined pressure value. Preferably, the upstream area from the casting bead is decompressed within a range of −2500 Pa to −10 Pa relative to the downstream area from the casting bead. Moreover, it is preferable that a jacket (not shown) is attached to the decompression chamber 90 to maintain the inside temperature at a predetermined value. Further, it is preferable to attach a suction unit (not shown) to an edge of the casting die 81 in order to keep a desired shape of the casting bead. A preferable range of air volume aspirated in the edge portion is 1 L/min to 100 L/min.

After the casting membrane 24a has possessed a self-supporting property, the casting membrane 24a is peeled off as the membrane 62 from the belt 82 while being supported by a peel roller 109. After that, the membrane 62 containing the solvent is carried along the transporting section 101 supported by the many rollers to the tenter device 64. In the transporting section 101, it is possible to give a draw tension to the membrane 62 by increasing a rotation speed of the downstream roller relative to that of the upstream roller. In the transporting section 101, dry air of a desired temperature is sent from the air blower 102 to the proximity of or directly to the membrane 62 to promote drying of the membrane 62. At this time, it is preferable that the temperature of the dry air is in a range of 20° C. to 250° C.

The membrane 62 transported to the tenter device 64 is dried while carried in a state that both side edges thereof are held with clips 64a or the like. Instead of the clips 64a, it is also possible to put pins through the membrane 62 for holding the membrane 62. It is preferable to separate inside the tenter device 64 into different temperature zones to adjust the drying conditions. In the tenter device 64, it is possible to stretch the membrane 62 in the width direction. Through at least one of the transporting section 101 and the tenter device 64, the membrane 62 is preferably stretched in at least one of the casting direction and the width direction by 100.5%-300% with respect to the size of the membrane 62 before the stretching.

The membrane 62 is dried by the tenter device 64 until the remaining solvent reaches a predetermined value. Both side edges of the membrane 62 are cut off by the edge slitting device 67. The cut edges are sent to the crusher 103 by a cutter blower not shown. The side edges of the membrane 62 are shredded into chips by the crusher 103. Since the chips are recycled for preparing the dope, the materials are efficiently utilized. The slitting process for the membrane side edges may be omitted. However, it is preferable to perform the slitting process between the casting process and the membrane winding process.

The membrane 62 whose side edges are cut off and removed is transported to the drying chamber 69 for further drying. A temperature inside the drying chamber 69 is not particularly limited. However, it is preferable to determine the temperature according to the heat resistance (glass transition point Tg, heat deflection temperature under load, melting point Tm, continuous working temperature and the like) of the solid electrolyte, and the temperature is preferably not more than the Tg. It is preferable to dry the membrane 62 such that the remaining solvent of the membrane 62 is less than 5 wt. %. In the drying chamber 69, the membrane 62 is transported while being bridged across the rollers 68. The solvent vapor generated by drying the membrane 62 in the drying chamber 69 is adsorbed and recovered by the absorbing device 106. The air from which the solvent is removed is supplied to the drying chamber 69 as the dry air. The drying chamber 69 is preferably divided into plural sections so as to change the temperature of the dry air in each section. It is also preferable to provide a predrying chamber (not shown) between the edge slitting device 67 and the drying chamber 69 to predry the membrane 62. Thereby, in the drying chamber 69, an abrupt increase of the membrane temperature is prevented so that changes in shapes and conditions of the membrane 62 are prevented.

After the drying in the drying chamber 69, the membrane 62 is cooled to the room temperature in a cooling chamber 71. When the humidification chamber is provided between the drying chamber 69 and the cooling chamber 71, it is preferable to spray air whose humidity and temperature are adjusted to desired values to the membrane 62. Thereby, curling and winding defects in the membrane 62 are prevented.

In the solution casting method, various processes such as the drying process and the edge slitting and removing process are performed between the membrane peeling process in which the membrane (solid electrolyte membrane) 62 is peeled off from the support, and the membrane winding process in which the membrane 62 is wound. During each process or between the above processes, the membrane 62 is mostly supported or transported by using the rollers. There are driven rollers and non-driven rollers. The non-driven rollers determine the transporting passage of the membrane 62 and improving the transportation stability during the transportation of the membrane 62.

The charged voltage during the transportation of the membrane 62 is controlled by the neutralization device 72 at a desired value. The charged voltage after the neutralization is preferably in a range of −3 kV to +3 kV. Further, knurling is preferably provided to the membrane 62 by using the knurling roller pair 73. Note that the height of each of projections and depressions of the knurling is preferably in a range of 1 µm to 200 µm.

The membrane 62 is wound by a winding roll 107 of the winding device 76. It is preferable to apply the tension of the desired value to the membrane 62 by the press roller 108 during the winding of the membrane 62. It is preferable to gradually change the tension applied to the membrane 62 from the start to the end of the winding. Thereby, excessive tightening during the winding is prevented. A width of the membrane 62 is preferably 100 mm or more. The present invention is also applicable to the production of thin membranes with the thickness in a range of 5 µm to 300 µm. The present invention is especially effective in producing the membrane with the thickness in a range of 10 µm to 200 µm.

Figure 3:
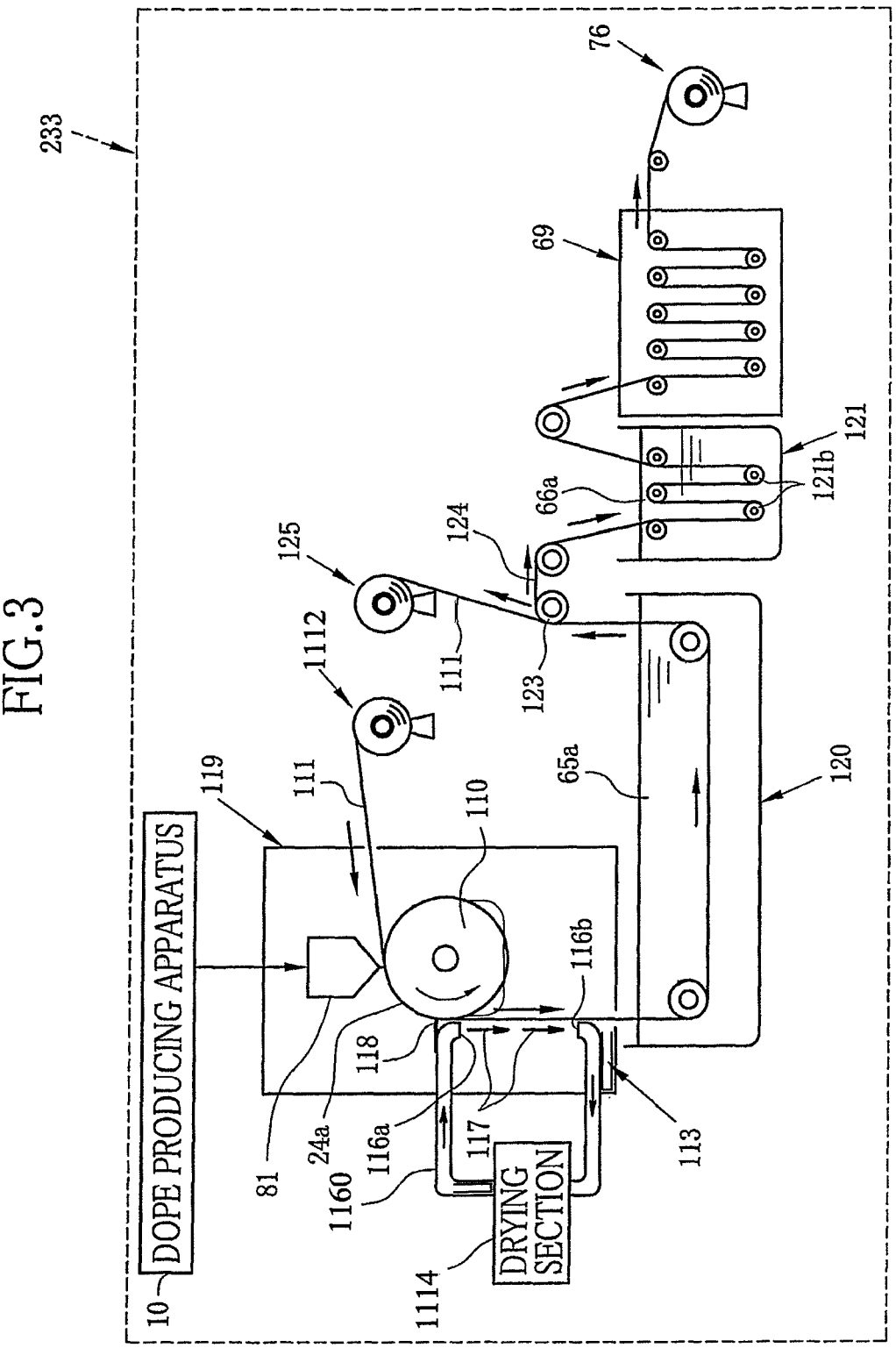
FIG. 3 is a schematic view illustrating a membrane producing apparatus of another embodiment.

Next, referring to FIG. 3, a membrane producing apparatus 233 which is a second embodiment of the present invention is described. The membrane producing apparatus 233 uses a plastic membrane (hereinafter referred to as a web) 111 wrapped around a casting drum 110 as the support instead of the belt 82 used in the membrane producing apparatus 33. The web 111 is loaded in a web feeding device 1112 in a roll form. From the web feeding device 1112, the web 111 is fed into the casting drum 110. Above the casting drum 110, the casting die 81 is disposed in the proximity of the web 111. The dope is cast from the casting die 81 onto the web 111 to form the casting membrane 24 on the web 111 while the web 111 is being transported. Note that the dope 24 and the casting die 81 are the same as those used in the first embodiment so that the description thereof is omitted.

Along the passage of the web 111, a casting membrane drying device 113 is provided. The casting membrane drying device 113 is constituted of a drying section 1114. The drying section 1114 is constituted of a duct 1160 having an outlet 116a and an exhaust port 116b, an air blower, a heating device, an opening to introduce outside air and so forth. Dry air 117 is blown from the outlet 116a to the casting membrane 24a in the direction of and parallel to the transporting direction of the web 111. Thus, the evaporation of the solvent is promoted. When the casting membrane drying device 113 uses the dry air for drying the casting membrane 24a as above, an air shield plate 118 is necessary between the casting die 81 and the outlet 116a. Surface fluctuations of the casting membrane 24a caused by the dry air 117 is prevented by the air shield plate 118 so that the membrane with low unevenness in the thickness is obtained. The casting die 81, the casting drum 110, the outlet 116a and the exhaust port 116b of the casting membrane drying device 113 are provided in a casting chamber 119.

In the case the predetermined amount of solvent is evaporating from the casting membrane 62, in order to control the amount of solvent vapor in the casting chamber 119, the gases other than the solvent vapor in the casting chamber 119 should be recovered and kept at a predetermined amount. Instead of the above dry air supplying method, it is also possible to put a cover in the transportation passage of the support membrane 111 from the casting die 81 to the first liquid bath 120 or to adjust a distance between the casting and the first liquid bath 120. Moreover, it is also possible to adjust pressure of the solvent vapor, the pressure of gases other than the solvent vapor, temperature, air supplying velocity, air discharge velocity and the like in this ambience. As the drying method, it is also possible to use infrared rays, decompression, far infrared rays and microwaves for drying instead or in addition to the above dry air.

As the web 111, the nonwoven plastic membrane such as polyethylene terephthalate (PET) film, polybutylene terephthalate (PBT) film, nylon 6 film, nylon 6, 6 film, polypropylene film, polycarbonate film, polyimide film or the like is used. It is preferable that the web 111 has chemical stability against the solvent. It is also preferable that the web 111 is heat resistant to withstand the membrane forming temperature. In this embodiment, the PET film is used as the web 111.

A feeding speed of the web 111, that is, a casting speed is preferably in a range of 0.5 m/min. to 100 m/min. The surface temperature of the web 111 is properly determined according to the material thereof. The surface temperature is preferably adjusted in a range of −20° C. to 100° C. To adjust the surface temperature of the web 111, the passage for the heat transfer medium (not shown) is formed inside the casting drum 110 to feed the heat transfer medium whose temperature is kept at the predetermined value. During the rotation of the casting drum 110, the position fluctuations in the vertical direction thereof due to displacements of its rotation center is preferably adjusted to be not more than 0.2 mm. Defects on the surface of the web 111 should be minimized. Particularly, the number of pin holes whose diameter is 30 µm or more is zero, the number of pinholes whose diameter is 10 µm or more and less than 30 µm is 1 or less per 1 m², and the number of pinholes whose diameter is less than 10 µm is 2 or less per 1 m².

The first and second liquid baths 120, 121 are constituted in the same manner as those in the first embodiment. The first liquid 65a is stored in the first liquid bath 120. The second liquid 66a is stored in the second liquid bath 121. After the immersion in the first liquid bath 120, the casting membrane 24a on the web 111 has a self-supporting property. The casting membrane 24a is peeled off from the web 111 by using a peel roller 123. Hereinafter the peeled membrane is referred to as a membrane 124. The membrane 124 is immersed in the second liquid bath 121 by using guide rollers 121b. The solvent contained in the casting membrane 24a is reduced by substituting the first liquid 65a for the solvent contained in the casting membrane 24a in the first liquid bath 120 to promote the drying of the membrane 124 in the next drying process in the drying chamber 69. In addition, by substituting the second liquid 66a for the first liquid 65a and a mixture of the first liquid 65a and the solvent contained in the casting membrane 24a in the second liquid bath 121, the drying of the membrane 124 is further promoted. Hereinafter, the substitution of the first and the second liquids 65a and 66a for the organic solvent contained in the casting membrane 24a and/or the membrane 62 described above is referred to as a solvent substitution. After the immersion in the second liquid bath 121, the membrane 124 is dried in the drying chamber 69 and wound by the winding device 76 in the roll form.

The remaining solvent in the membrane 124 at the time of peeling off from the web 111 is preferably in a range of 200 wt. % to 950 wt. % to the total solid components in the membrane 124. As a predrying process before the immersion in the second liquid bath 121, it is possible to use the tenter device 64 of the first embodiment shown in FIG. 2 and/or the drying chamber 69 using the rollers. For instance, the casting membrane 24a is dried in the tenter device 64 together with the web 111 in the tenter device 64, and then the casting membrane 24a is dried in the drying chamber 69 using the rollers. The order is not particularly limited in the present invention. Further, the tenter device 64 is properly installed, for instance, between the membrane peeling process and the membrane winding process.

After the membrane 124 is peeled off, the web 111 is wound by a web winding device 125 in a roll form. To supply the web 111 continuously, it is preferable that both the web feeding device 1112 and the web winding device 125 have a turret mechanism. In the second embodiment, instead of the web feeding device 1112 and the web winding device 125, it is also possible to provide guide rollers only. In this case, the web 111 is circulated in an endless loop. A surface detecting device is provided between the guide rollers to detect the surface roughness of the web 111. When the number and the size of pin holes exceed the predetermined value, a new web 111 is supplied. To supply the new web 111, the old web 111 is cut and the new web 111 is adhered thereto. When the new web 111 is rotated by a round, the old web 111 is cut off and removed so as to bond the ends of the new web 111 to form the endless loop. Further, to prevent the membranes 124 from sticking together and to protect the surface thereof, it is also possible to wind the web 111 together with the casting membrane 24a. In this case, the casting membrane 24a is peeled off from the web 111 at the time of producing the fuel cell as will be described later.

Figure 4:
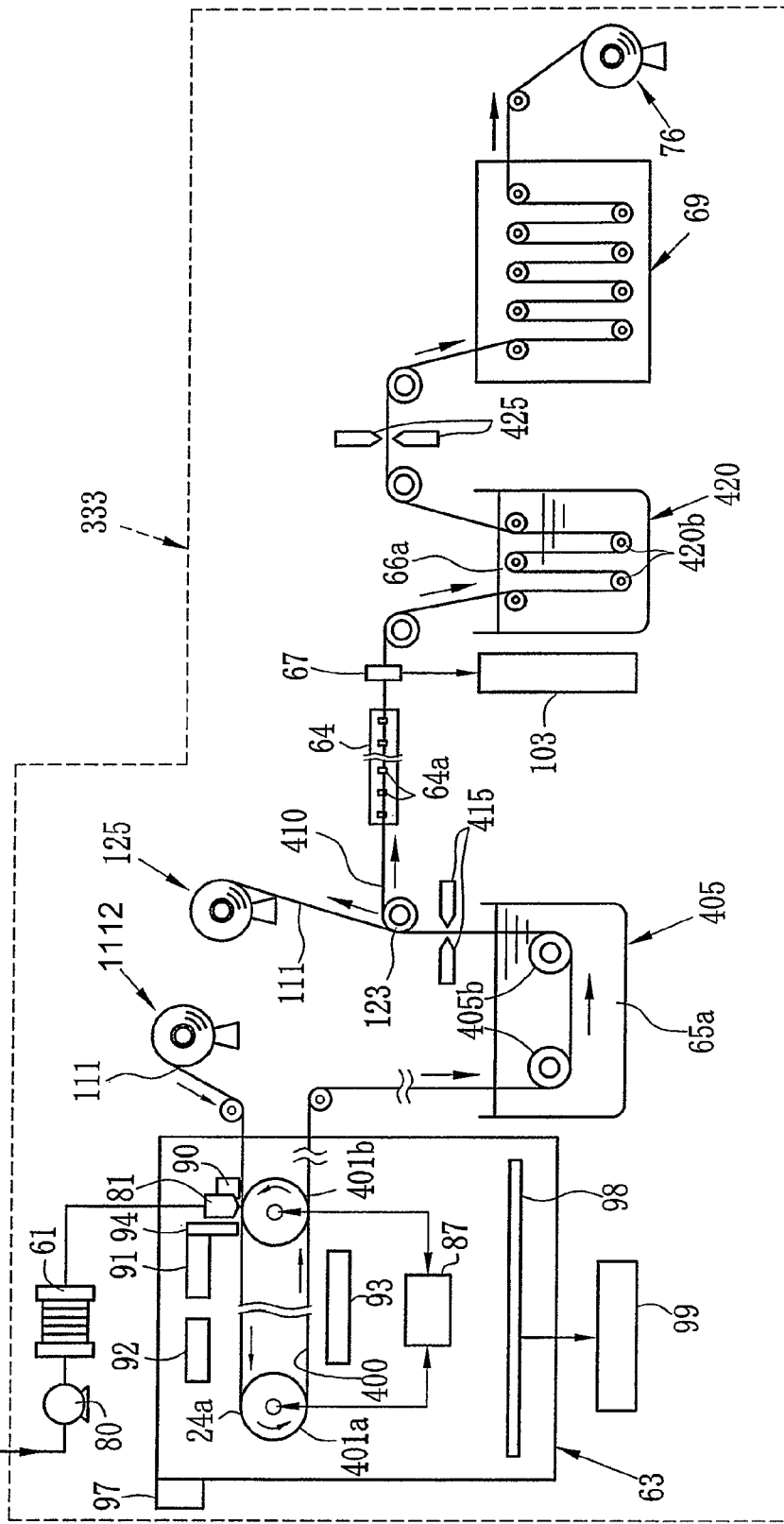
FIG. 4 is a schematic view illustrating a membrane producing apparatus of another embodiment.

Next, a third embodiment which is the most preferable embodiment in the present invention is described. FIG. 4 is a schematic view of a membrane producing apparatus 333 of the third embodiment. The membrane producing apparatus 333 is provided with the web 111 instead of the belt 82 shown in FIG. 2. In a producing method using the membrane producing apparatus 333, the casting membrane 24a is peeled off as a membrane 410 after the casting membrane 24a formed on the web 111 is immersed in the first liquid 65a. Note that the same numerals are assigned to the devices and members constituting the membrane producing apparatus 333 similar to those in the first and second embodiments shown in FIGS. 2 and 3, and descriptions thereof are omitted.

The web 111 is loaded in the web feeding device 1112 in the roll form in the same manner as that in the second embodiment. The casting chamber 63 is provided with a belt 400 for supporting the web 111. The belt 400 is bridged across drums 401a, 401b to form a passage through which the web 111 passes in the casting chamber 63. The web 111 is fed by the web feeding device 1112 to the belt 400 and transported along the passage in the casting chamber 63. Thereafter, the web 111 is transported out of the casting chamber 63. Instead of using the belt 400, it is also possible to use the above-mentioned casting drum 110 to support the web 111.

In the proximity of the transportation passage in the casting chamber 63, the casting die 81 is disposed. The dope 24 is cast from the casting die 81 to the web 111 to form the casting membrane 24a while the web 111 is being transported. In the proximity of the passage in the downstream from the casting die 81, the air blowers 91-93 and the air shielding plate 94 are provided in the same manner as those in the first embodiment. The casting membrane 24a is dried by the dry air from the air blowers 91-93 while the web 111 is being transported along the passage.

The casting membrane 24a is dried until the remaining solvent reaches the predetermined value. Thereafter, the casting membrane 24a together with the web 111 is transported outside the casting chamber 63. In the downstream from the casting chamber 63, the web winding device 125 is disposed. The web 111 is transported by the guide rollers and wound by the membrane winding device 125.

Guide rollers 405b are provided between the casting chamber 63 and the web winding chamber 125. A first liquid bath 405, a first water remover 415 and the peel roller 123 are disposed in this order. The casting membrane 24a is transported from the casting chamber 63 by the web winding device 125 and the guide rollers 405a. The casting membrane 24a comes in contact with the first liquid 65a while being supported by the web 111. Thereafter, the casting membrane 24a supported by the web 111 is transported from the first liquid bath 405 to the first water remover 415.

Water on the casting membrane 24a supported by the web 111 is removed by the water remover 415. As the water remover 415, for instance, blades, an air knife, rolls or the like are used.

Among the above, the air knife is most preferable for the water remover 415 since the air knife removes water most efficiently. By adjusting air flow volume and air pressure of the air blown onto the casting membrane 24a, the air knife removes the remaining moisture content on the surface of the casting membrane 24a almost completely. However, if the air flow volume is too large, flutter or tilt may occur in the casting membrane 24a which adversely affect the transporting stability. For that reason, the airflow volume is preferably in a range of 10 m/s to 500 m/s, more preferably, 20 m/s to 300 m/s, and most preferably, 30 m/s to 200 m/s. Note that the above air flow volume is not particularly limited. The air flow volume is properly determined depending on the moisture content on the surface of the casting membrane 24a before using the water remover 415, the transporting speed or the like.

To uniformly remove the moisture content on the surface of the casting membrane 24a, a variation range in the airflow velocity distribution in the width direction of the casting membrane 24a is preferably set at 10% or less, and more preferably 5% or less by adjusting the outlet of the air knife or the air supplying method of the air knife. The closer the clearance between the surface of the casting membrane 24a and the outlet of the air knife, the more moisture content on the surface of the casting membrane 24a is removed. However, at the same time, the surface of the casting membrane 24a is more likely to be damaged by the outlet of the air knife. Accordingly, the air knife is installed such that the clearance between the surface of the casting membrane 24a and the outlet of the air knife is in a range of 10 µm to 10 cm, more preferably 100 µm to 5 cm, and most preferably 500 µm to 1 cm. It is preferable to install the air knife and a backup roll on opposite sides of the transportation passage of the casting membrane 24. The backup roll supports the casting membrane 24a so as to stabilize the clearance setting and reduce the flutters, wrinkles and deformations of the casting membrane 24a.

The casting membrane 24a which passed through the first water remover 415 is transported to the peel roller 123. The peel roller 123 peels off the casting membrane 24a from the web 111 as the membrane 410 and transport the membrane 410 to the tenter device 64. In the tenter device 64, the membrane 410 is dried until the remaining solvent reaches the predetermined value. Thereafter, the membrane 410 is transported to the edge slitting device 67.

In a second liquid bath 420 in which the second liquid 66a is stored, guide rollers 420b are provided. The membrane 410 whose side edges have been cut off and removed by the edge slitting device 67 is transported to the second liquid bath 420 by the guide rollers 420, immersed into the second liquid 66a and transported out of the second liquid bath 420. Thus, the second liquid 66a substitutes for the first liquid 65a and the mixture of the first liquid 65a and the solvent contained in the membrane 62 by contacting the membrane 410 with the second liquid 66a. Thereafter, the membrane 410 is transported to a second water remover 425. The second water remover 425 has the same structure as the first water remover 415 and is used for removing the water from the surface of the membrane 410. The membrane 410 which passed the first water remover 415 is transported to the drying chamber 69. In the drying chamber 69, the dry air is blown onto the membrane 410 for drying while the membrane 410 is being transported. As described above, the time for drying the membrane 410 in the tenter device 64 and the drying chamber 69, that is, the time for removing the organic solvent contained in the membrane 410 is shortened by contacting the membrane 410 with the first and second liquids 65a and 66a. The time for drying the membrane 410 is further shortened by removing the water from the surface of the membrane 410 with the use of the first and second water removers 415 and 425.

In the present invention, as described above, the casting membrane or the membrane is dried before contacting with the poor solvent of the solid electrolyte. Such drying process reduces the remaining solvent in the casting membrane or the membrane so that the formation of pores in the casting membrane or in the membrane is prevented. Thus, it becomes possible to obtain the solid electrolyte membrane with very little defects.

In chemical formula 1, if X is a polymer which is a cation species other than the hydrogen atom H, that is, the precursor of the solid electrolyte, it is possible to perform acid processing during the above-mentioned producing method of the solid electrolyte membrane. In the acid processing, proton substitution is performed by contacting the precursor membrane with the solution containing acid which is a proton-donating substituent. Thereby, the solid electrolyte is generated from the precursor in the precursor membrane. Thus, the solid electrolyte membrane is produced from the precursor membrane by the proton substitution. Note that the proton substitution in the present invention is to substitute the hydrogen atom for the cation species X other than the hydrogen atom(s) H in the polymer.

To perform the proton substitution in the precursor membrane with a high degree of efficiency, the remaining solvent in the precursor membrane is preferably not less than 1 wt. % and not more than 100 wt. % (dry measure). If the drying is continued until the remaining solvent achieves less than 1 wt. %, the drying time becomes too long which is not preferable. If the acid processing is performed to the precursor membrane containing the remaining solvent exceeding 100 wt. % (dry measure), a percentage of voids becomes too large which is not preferable.

After the proton substitution, it is preferable to perform a washing process to remove the solution containing acid which has not been used for substituting hydrogen atom(s) for cation species from the membrane. Thereby, it becomes possible to prevent the polymer constituting the solid electrolyte membrane from being contaminated by the remaining acid.

As a method for washing the membrane after the proton substitution, it is preferable to immerse the membrane in the water. However, the method is not particularly limited to the above as long as the method is capable of removing the acid by contacting the membrane to the water. For instance, it is also possible to coat or spray the water onto the surface of the solid electrolyte membrane. Such methods are applicable while the membrane is being transported continuously without reducing the productivity thereof.

As the method for applying the water to the membrane, for instance, a method using an extrusion coater or various coating heads such as a fountain coater or a frog mouth coater is used. As the method for spraying the water onto the membrane, for instance, a method using a spray nozzle which is commonly used for humidification of air, painting, automatic washing of a tank and so forth is used. The coating methods disclosed in "All about coating", edited by Masayoshi Araki, published by Kako Gijutsu Kenkyukai (Converting Technical Institute), 1999, are also applicable to the present invention. Further, in the case the spray nozzle is used, it becomes possible to spray the washing liquid across the entire width of the membrane by arranging a plurality of conical or sector spray nozzles manufactured by Ikeuchi Co., Ltd. or Spraying Systems Co., Ltd. along the width direction of the membrane.

The higher the velocity of spraying water, the higher the turbulent mixing effect is obtained. However, such turbulent mixing effect may cause the reduction in the transportation stability of the membrane. For that reason, it is preferable to spray the washing liquid at a spraying velocity of 50 cm/s to 1000 cm/s, more preferably 100 cm/s to 700 cm/s, and most preferably 100 cm/s to 500 cm/s.

The amount of water to be used in washing should be larger than the calculated amount based on a theoretical dilution ratio defined by an equation (1) below. The theoretical dilution ratio is defined on the assumption that the whole amount of water for washing contributes to dilution of the contact solution containing the acid. Actually, since the whole amount of water does not contribute to form a mixture, a larger amount of water than that derived from the theoretical dilution ratio is used in practice. The amount of water varies depending upon the acid concentration of the solution used, additives, and type of a solvent; however, water is used in an amount providing a dilution ratio of at least 100 to 1000 times, preferably 500 to 10,000 times, more preferably 1,000 to 100,000 times. Note that in the equation (1) below, volumes each of water and aqueous acid solution is a liquid amount contacting with the membrane per a unit area.

$$\text{Theoretical dilution ratio} = (\text{amount of washing liquid } 121[cc/m^2]) + (\text{amount of aqueous acid solution } 110[cc/m^2]) \quad (1)$$

When a predetermined amount of water is used for washing, it is preferable to divide the predetermined amount of water into several portions to contact the membrane with the water several times rather than to use the whole amount of water at one time, that is, a so-called batch washing. The predetermined amount of water is divided and supplied to plural washing means disposed along the transportation passage. Appropriate distance is preferably provided between the adjacent washing devices so as to diffuse the water on the membrane to promote dilution. Further, it is preferable to incline the solid electrolyte membrane being transported such that the water flows over the membrane surface so as to diffuse the water and dilute the solution containing acid. The dilution efficiency is improved by providing water remover which removes the water on the membrane between the washing devices. As the washing device, those similar to the aforementioned first and second water removers 415, 425 are used.

It is advantageous to dispose the large number of the washing devices as much as possible along the transportation passage. However, in terms of installation space and cost, it is preferable to dispose the washing devices in 2-10 positions, more preferably 2-5 positions along the transportation passage.

The above acid processing and washing are performed between a process after the formation of the casting membrane and a process for obtaining the membrane product. For instance, a first tank and a second tank are provided between the casting chamber and the tenter device. The solution containing the acid is stored in the first tank. Water is stored in the second tank. The casting membrane which has been dried is transported to the first tank for the acid processing and then to the second tank for washing. The casting membrane is transported to each tank while being supported by the support, or after the casting membrane is peeled off from the support. After the washing, it is preferable to remove the water from the surface of the casting membrane or the membrane by using the water remover. The water remover is not particularly limited, and it is possible to use aforementioned water removers.

In the above embodiment, two liquid baths are provided. However, one or more liquid baths may be used. In the above embodiment, two liquid baths are installed in tandem. However, it is also possible to provide another process such as the drying process between the first and second liquid baths. To contact the membrane with the solution, in addition to immersing the membrane in the liquid baths, spraying, coating and other methods may be used. A single solvent or a mixture of two or more solvents is used for preparing an optimum solution for contacting the membrane depending on the organic solvent used for the membrane production. The organic solvent is more securely removed from the membrane by performing the solution contact process for several times.

In the present invention, two or more sorts of dopes are co-cast to produce a solid electrolyte multilayer membrane. As the co-casting method, there are a simultaneous co-casting method in which two or more sorts of the dopes are simultaneously cast, or a sequentially casting method in which two or more sorts of the dopes are sequentially cast. When the co-casting is performed, the casting die with a feed block or a multi-manifold type casting die can be used.

Figure 5:
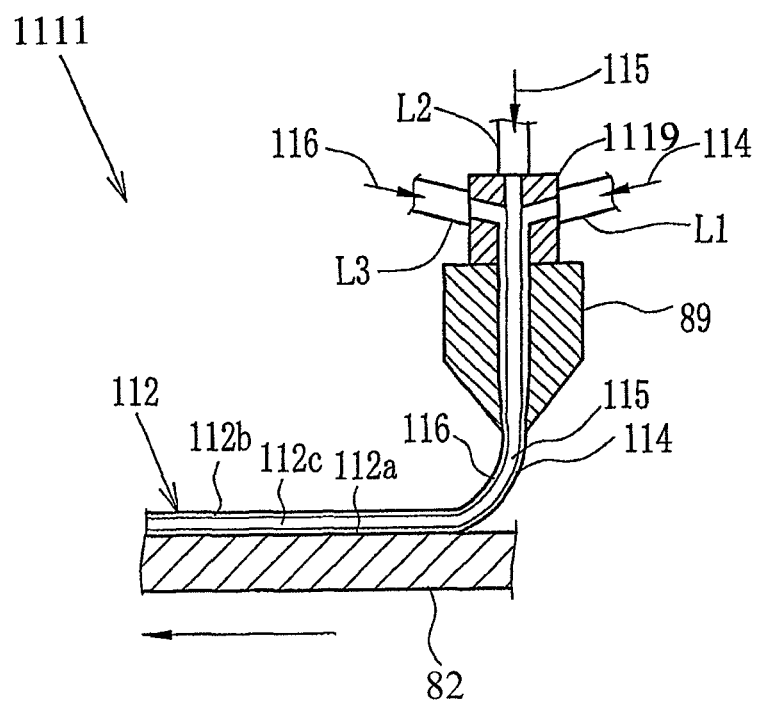
FIG. 5 is a section view of a simultaneous co-casting apparatus.

The simultaneous co-casting method is described. FIG. 5 is a schematic view illustrating the simultaneous co-casting apparatus. In FIG. 5, the same numerals are assigned to the members similar to those in FIG. 2. A simultaneous co-cast apparatus 1111 forms a three-layer casting membrane 112. Accordingly, a three layer solid electrolyte membrane is obtained. However, according to prescriptions of dopes 114 to 116, boundaries of the layers may become indistinguishable. In such case, the solid electrolyte membrane may appear to have only one layer or two layers. When the solid electrolyte multilayer membrane has three layers, a layer contacting a belt 82 is referred to as a first surface layer 112a, a layer exposed to the air is referred to as a second surface layer 112b, and a layer interposed by the first and second surface layers 112a and 112b is referred to as an inner layer 112c.

The first, second and third dopes 114, 115 and 116 are cast onto the belt 82 to form the first surface layer 112a, the inner layer 112c and the second surface layer 112b respectively. The first to third dopes 114-116 are fed to a feed block 1119 attached to the casting die 81 through individual liquid passages L1-L3. In the feed block 1119, the liquid passages L1-L3 are joined together to simultaneously cast the first to third dopes 114-116 from the lip end of the feed block 1119. In other words, in the feed block 1119, three liquid passages which join into one liquid passage are formed. The liquid passage placed in the middle of the three liquid passages is for the second dope 115. The liquid passage placed upstream from the middle liquid passage in the transport direction of the belt 82 is for the first dope 114. The liquid passage downstream from the middle passage in the transport direction of the belt 82 is for the third dope 116.

The first and third dopes 114, 116 forming the first and second surface layers 112a, 112b have lower viscosity than that of the second dope 115 forming the inner layer 112c. Thereby, it becomes possible to form the membrane in which abnormal properties such as melt fracture is prevented. In some cases, it is preferable to intentionally form a bead between the casting die 81 and the belt 82 such that the higher viscosity layer (the inner layer 112c) is sandwiched by the lower viscosity layers (the first and second surface layers 112a and 112b) as above when the first, second and third dopes 114, 115 and 116 are cast after each viscosity is properly adjusted. In some cases, it is preferable to add the poor solvent only to the first and third dopes 114 and 116. In some cases, it is preferable to add the poor solvent to all of the first to third dopes 114-116 but to make the ratio of the poor solvent in the first and third dopes 114 and 116 higher than that in the second dope 115. In this case, it is preferable to cast the dope such that the thickness of the first surface layer 112a contacting the belt 82 is not less than 5 μm in a wet state.

Thus, the casting die 81 has one outlet for casting the dope. By the combined use of the feed block 119 and the casting die 81, the first to third dopes 114-116 are simultaneously cast from the outlet. Instead of using the feed block 1119 and the casting die 81, it is also possible to use a casting die which casts the first to third dopes 114-116 separately from three individual outlets. In this case, the three outlets formed in the casting die are aligned in the transport direction of the belt 82.

In a single layer casting, it is often necessary to cast a solid electrolyte solution of higher concentration and high viscosity so as to form the membrane with the desired thickness. In such case, dope often becomes unstable and solids may be generated. The generated solids are mixed into the membrane as foreign matters, compromising the planarity of the membrane. By using the above co-casting method, not only the planarity is improved, but also the second dope with the high concentration is cast without trouble. Accordingly, drying efficiency is improved to enhance the production speed.

The thickness of each of the layers 112a-112c is not particularly limited. However, the sum of the thickness of the first and second surface layers 112a, 112b preferably occupies 1%-50%, more preferably 2%-30% of the total thickness of the solid electrolyte membrane as the product after drying.

It is possible to use the dopes 114-116 with the different concentrations. It is also possible to add different additives to each dope. In particular, it is also possible to add the aforementioned antioxidants, fibers, fine particles, water absorbing agents, plasticizers and solubilizers of different types and concentrations to each dope. For instance, amounts of the antioxidants and fine particles (matting agents) added to the first and second surface layers 112a and 112b may be larger than those added to the inner layer 112c, or the antioxidants and fine particles may be added only to the first and second surface layers 112a and 112b. Amounts of the water absorbing agents, solubilizers and plasticizers added to the inner dope forming inner layer 112c may be larger than those added to the first and second surface layers 112a and 112b, or such additives may be added only to the inner dope forming inner layer 112c. It is also possible to add the low volatile antioxidant to the surface layers 112a and 112b, and add the plasticizer and the water absorbing agent to the inner layer 112c. It is also possible to add the peeling agent only to the first dope 114 forming the first surface layer 112a contacting the casting die 81. Thus, by adding appropriate additives to each dope, the desirable functions are added to each layer. Further, it is also possible to cast the solid electrolyte solution of the present invention simultaneously with the other function layers, for instance, a catalyst layer, an antioxidant layer, antistatic layer, a lubricating layer and the like.

It is preferable to add the fine particles to the first and second surface layers 112a, 112b so as to improve lubricating property of the membrane. To improve the lubricating property of the membrane, it is effective to add the fine particles to at least one of the first and second surface layers 112a, 112b. An apparent specific gravity of the fine particles is preferably not less than 70 g/liter, more preferably 90 g/liter-200 g/liter, and most preferably 100 g/liter-200 g/liter. The fine particles with the higher apparent specific gravity enable to prepare a dispersion liquid with higher concentration which prevents agglomeration. If silicon dioxide is used as the fine particles, an average diameter of a primary particle is preferably not more than 20 nm, and the apparent specific gravity is preferably not less than 70 g/liter. Such silicon dioxide is obtained by, for instance, mixing silicon tetrachloride and hydrogen, and then burning the mixture in the air. Instead of such silicon dioxide, it is also possible to use Aerosil 200V or Aerosil R972V produced by Nippon Aerosil Co. Ltd.

Figure 6:
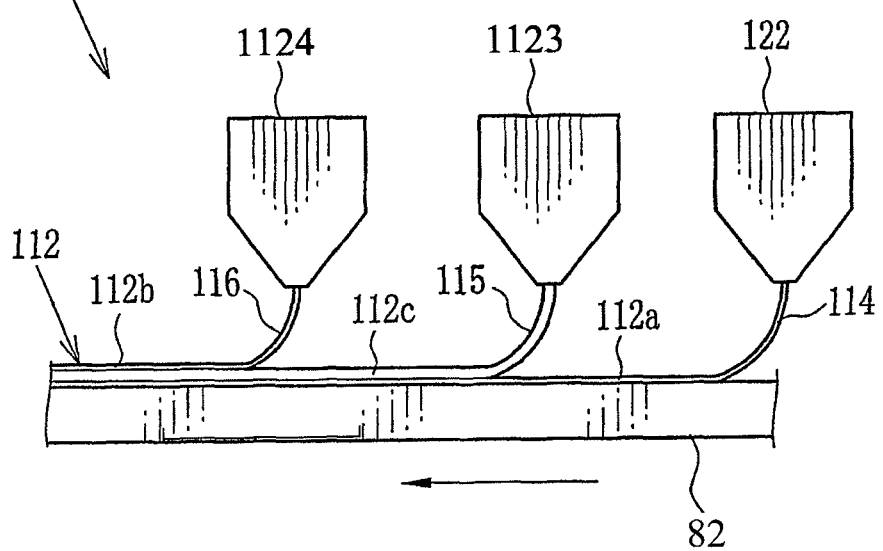
FIG. 6 is a section view of a sequential co-casting apparatus.

FIG. 6 is a schematic view of the sequential co-casting apparatus. In FIG. 6, an example in which first to third dopes 114-116 are co-cast is described. In a sequential co-casting device 1121, three casting dies 122, 1123, and 1124 are disposed in this order along the transport passage of the belt 82. The first dope 114 is cast from the casting die 122. The second dope 115 is cast from the casting die 1123. The third dope 116 is cast from the casting die 1124.

If the first to third dopes 114-116 of the same composition are sequentially co-cast, the membrane production speed is enhanced compared to that in the single layer casting. In this case, the positions of the second and third casting dies 1123, 1124 are determined according to the drying speed and the like of the preceding layer. For instance, it is preferable to dispose the second casting die 1123 at a position where a ratio of the distance between the most upstream casting die 122 and the second casting die 1123 to the distance between the most upstream casting die 122 and the position to peel the casting membrane is in a range of 30%-60%.

In addition to the above methods, following method is available as an example. A first dope is cast from a first casting die to form a membrane, and the membrane is peeled off. Then, a second dope is cast from a second casting die onto the peeled surface of the peeled membrane to form the double-layer membrane.

Regardless of the single layer casting method or co-casting method, there are various methods for casting the dope, for instance, a method in which the dope is uniformly extruded from a pressure die, a doctor blade method in which a thickness of the casting membrane on the support is adjusted by using a blade, and a reverse roll coating method in which a casting amount of the dope is adjusted by leveling the surface of the dope by using rollers rotating in reverse directions. Among the above, the method using the pressure die is preferable. As the pressure die, there are a coat hanger type, a T-die type and so forth. Any type of the pressure die is preferably used.

Instead of the above method, it is also possible to produce a different type of the solid electrolyte membrane by putting the solid electrolyte in the micropores of a so-called porous substrate in which a plurality of micropores are formed. As examples of such methods, there are a method in which the solid electrolyte is put in the micropores by applying a sol-gel solution containing the solid electrolyte onto the porous substrate, a method in which the solid electrolyte is filled in the micropores by immersing the porous substrate in the sol-gel reaction liquid and the like. As the porous substrate, porous polypropylene, porous polytetrafluoroethylene, porous cross-linked heat-resistant polyethylene, porous polyimide and the like are preferably used. It is also possible to produce the membrane by processing the solid electrolyte into a fiber-form and fill the voids in the fibers with other polymers, and forming the fibers into the membrane. As the polymer for filling the voids, it is possible to use the additives described in this specification.

The solid electrolyte membrane of the present invention is suitably used for the fuel cell, in particular, for the proton conductive membrane in a direct methanol full cell. In addition, the solid electrolyte membrane is used as a component of the fuel cell interposed between the two electrodes of the fuel cell. Further, the solid electrolyte membrane of the present invention is used for the electrolyte in various batteries or cells such as a redox flow battery and the lithium battery, a display element, an electrochemical sensor, a signal transmission medium, a capacitor, electrodialysis, electrolyte membrane for electrolysis, a gel actuator, salt electrolyte membrane and proton exchange membrane.

(Fuel Cell)

Figure 7:
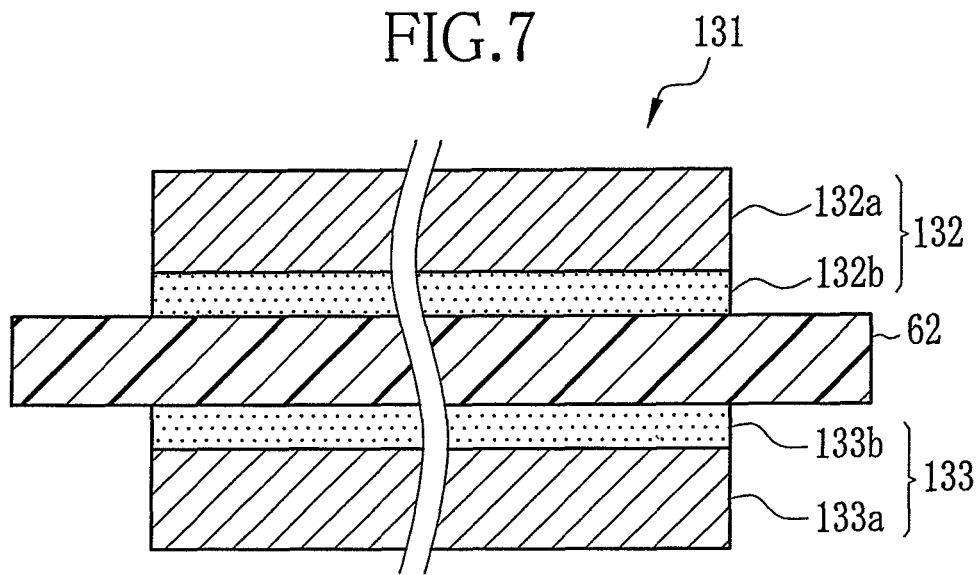
FIG. 7 is a section view of a membrane electrode assembly.

In the following, an example of using the solid electrolyte membrane in a membrane electrode assembly, hereinafter referred to as MEA), and an example of using the MEA in the fuel cell are described. The MEA and the fuel cell described in the following are examples of the present invention, but the present invention is not limited to the following examples. FIG. 7 is a section view illustrating a configuration of the MEA. An MEA 131 is constituted of the membrane 62, and an anode 132 and cathode 133 placed opposite to each other. The membrane 62 is interposed between the anode 132 and the cathode 133.

The anode 132 is constituted of a porous conductive sheet 132*a* and a catalyst layer 132*b* contacting the membrane 62. The cathode 133 is constituted of a porous conductive sheet 133*a* and a catalyst layer 133*b* contacting the membrane 62. As the porous conductive sheets 132*a*, 133*a*, carbon paper and the like are used. The catalyst layers 132*b*, 133B are formed of a dispersion in which carbon particles are dispersed into the proton conductive material. The carbon particles support a catalyst metal thereon such as platinum. As the carbon particles, there are ketjen black, acetylene black, carbon nanotubes. As the proton conductive material, for instance, Nafion and the like are used.

The following methods are preferably applied for producing the MEA 131:

(1) Proton conductive material coating method: a catalyst paste (ink) including an active metal-supported carbon, a proton conductive material and a solvent is directly applied on both surfaces of the membrane 62, and a porous conductive sheets 132*a*, 133*a* are thermally adhered under pressure thereto to construct a 5-layered MEA.

(2) Porous conductive sheet coating method: A liquid containing the material for the catalyst layer 132*b*, 133*b*, for instance, the catalyst paste is applied onto the porous conductive sheet 132*a* and 133*a* to form a catalyst layer thereon, and a solid electrolytic membrane 62 is adhered thereto under pressure to construct a 5-layered MEA.

(3) Decal method: The catalyst paste is applied onto PTFE to form catalyst layers 132*b*, 133*b* thereon, and the catalyst layers 132*b*, 133*b* alone are transferred to a solid electrolytic membrane 62 to construct a 3-layered structure. A porous conductive sheet is adhered thereto under pressure to construct a 5-layered MEA.

(4) Catalyst post-attachment method: Ink prepared by mixing a carbon material not supporting platinum powder and a proton conductive material is applied or cast onto a membrane 62, porous conductive sheet 132*a*, 133*a* or PTFE to form a membrane. Thereafter, the membrane 62 is immersed into a liquid containing platinum ion so as to reduce and precipitate the platinum particles in the membrane 62 to form the catalyst layers 132*b*, 133*b*. After the catalyst layers 132*b*, 133*b* are formed, the MEA 131 is produced by one of the above methods (1)-(3).

The method for producing the MEA 131 is not limited to the above and other known methods are also used. For instance, the following method is used instead of the above methods (1)-(4). A coating liquid containing materials of the catalyst layers 132*b*, 133*b* is previously prepared. The coating liquid is applied onto the support (or the web) and dried. The supports (or the webs) on which the catalyst layers 132*b*, 133*b* are formed are thermally adhered to both surfaces of the membrane 62 such that the catalyst layers 132*b*, 133*b* contact the membrane 62. After peeling the supports (or the webs), the membrane 62 interposed by the catalyst layers 132*b*, 133*b* is sandwiched between the porous conductive sheets 132*a*, 133*a*. Thus, the catalyst layers 132*b*, 133*b* are airtightly adhered to the membrane to produce the MEA 131.

Figure 8:
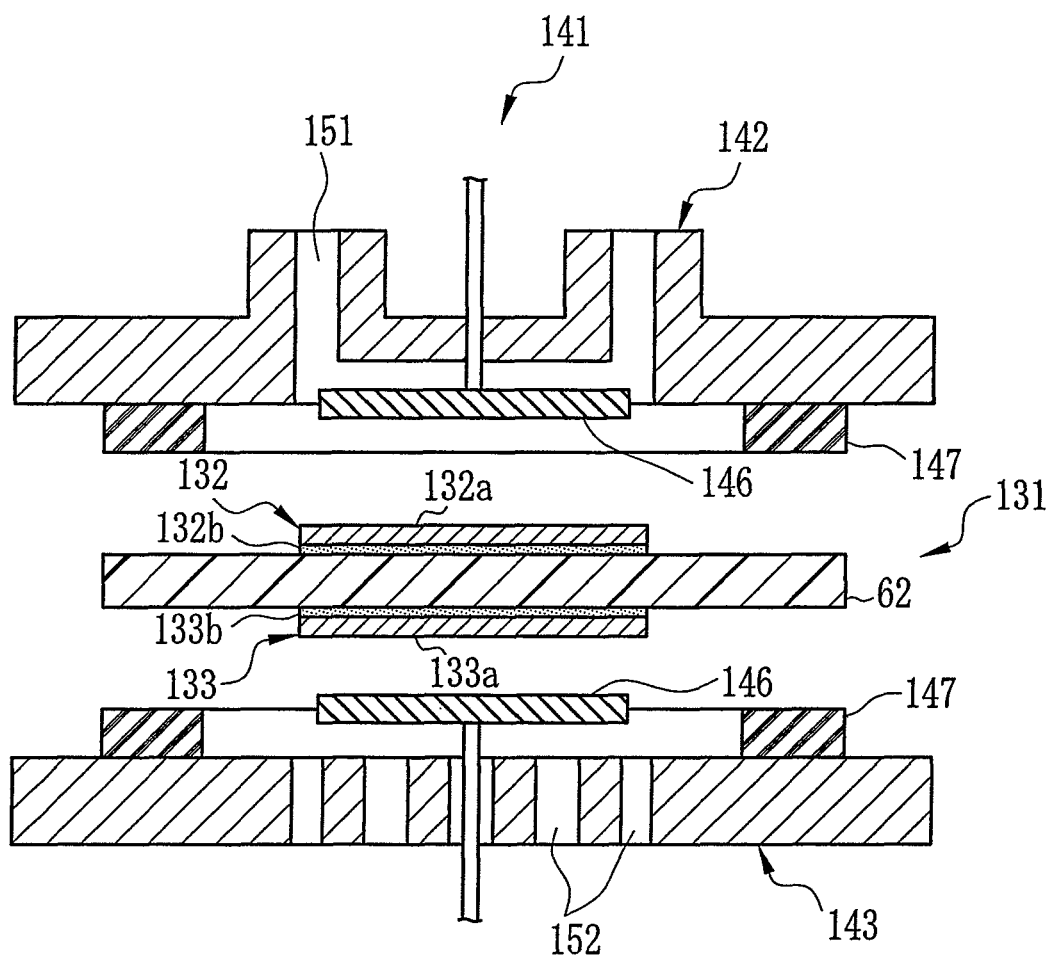
FIG. 8 is an exploded section view of a fuel cell.

FIG. 8 is an exploded section view illustrating a configuration of the fuel cell. The fuel cell 141 is constituted of the MEA 131, a pair of separators 142, 143 for sandwiching the MEA 131, current collectors 146 which are formed of stainless nets attached to the separators 142, 143, and gaskets 147. The anode-side separator 142 has an anode-side opening 151 formed therethrough; and the cathode-side separator 143 has a cathode-side opening 152 formed therethrough. Vapor fuel such as hydrogen or alcohol (e.g., methanol) or liquid fuel such as aqueous alcohol solution is fed to the cell via the anode-side opening 151; and an oxidizing gas such as oxygen gas or air is fed thereto via the cathode-side opening 152.

For the anode 132 and the cathode 133, for example, a catalyst that supports active metal particles of platinum or the like on a carbon material may be used. The particle size of the active metal particles generally used is in a range of 2 nm to 10 nm. Active metal particles having a smaller particle size may have a large surface area per the unit wt. thereof, and are therefore advantageous since their activity is higher. If too small, however, the particles are difficult to disperse with no aggregation, and it is said that the lowermost limit of the particle size is 2 nm or so.

In hydrogen-oxygen fuel cells, the active polarization of cathode (air electrode) is higher than that of anode (hydrogen electrode). This is because the cathode reaction (oxygen reduction) is slow as compared with the anode reaction. For enhancing the oxygen electrode activity, usable are various platinum-based binary alloys such as Pt—Cr, Pt—Ni, Pt—Co, Pt—Cu, Pt—Fe. In a direct methanol fuel cell in which aqueous methanol is used for the anode fuel, it is important that the catalyst poisoning with CO that is formed during methanol oxidation must be inhibited. For this purpose, usable are platinum-based binary alloys such as Pt—Ru, Pt—Fe, Pt—Ni, Pt—Co, Pt—Mo, and platinum-based ternary alloys such as Pt—Ru—Mo, Pt—Ru—W, Pt—Ru—Co, Pt—Ru—Fe, Pt—Ru—Ni, Pt—Ru—Cu, Pt—Ru—Sn, Pt—Ru—Au. As the carbon material for supporting the active metal, acetylene black, Vulcan XC-72, ketjen black, carbon nanohorn (CNH), and carbon nanotube (CNT) are preferably used.

The catalyst layer $132b$, $133b$ have following functions: (1) transporting fuel to active metal, (2) providing the reaction site for oxidation of fuel (anode) or for reduction thereof (cathode), (3) transmitting the electrons released by the redox reaction to the current collector $146$, and (4) transporting the protons generated in the reaction to solid electrolytic membrane $62$. For (1), the catalyst layers $132b$, $133b$ must be porous so that liquid and vapor fuel may penetrate the pores. The active metal catalyst supported by the carbon material works for (2); and the carbon material also works for (3). For attaining the function of (4), a proton conductive material is mixed into the catalyst layers $132b$, $133b$. The proton conductive material mixed in the catalyst layers $132b$, $133b$ is not particularly limited provided that it is a solid that has a proton-donating group. Polymer compounds having acid-residue used for the membrane $62$, for instance, perfluorosulfonic acids such as typically Nafion; phosphoric acid-branched poly(meth)acrylates; sulfonated, heat-resistant aromatic polymers such as sulfonated polyether-ether ketones, sulfonated polybenzimidazoles are preferably used. If the material of the membrane $62$, that is, the solid electrolyte is used for the material of the catalyst layers $132b$, $133b$, the catalyst layers $132b$, $133b$ and the membrane $62$ are made of the material of the same type. For that reason, the electrochemical contact between the solid electrolytic membrane and the catalyst layer becomes high, which is more advantageous in view of the proton conduction. The amount of the active metal is preferably from 0.03 mg/cm$^2$ to 10 mg/cm$^2$ in view of cell output and the cost efficiency. The amount of the carbon material that supports the active metal is preferably from 1 to 10 times the mass of the active metal. The amount of the solid electrolyte is preferably from 0.1 to 0.7 times the mass of the active metal-supporting carbon.

The anode $132$ and the cathode $133$ serve to prevent interference in current collection and gas permeation due to water accumulation. The carbon papers and carbon fibers are commonly used for the anode $132$ and the cathode $133$. It is also possible to perform polytetrafluoroethylene (PTFE) processing to the carbon paper and carbon fibers for repelling the water.

The MEA is preferably incorporated in the battery. Sheet resistivity measured by an AC impedance method when the fuel is loaded is preferably 3 $\Omega$cm$^2$ or less, more preferably 1 $\Omega$cm$^2$ and most preferably 0.5 $\Omega$cm$^2$ or less. The sheet resistivity is obtained by a product of an actually measured value and a sample area.

Fuel for the fuel cell is described. For anode fuel, hydrogen, alcohols (e.g., methanol, isopropanol, ethylene glycol), ethers (e.g., dimethyl ether, dimethoxymethane, trimethoxymethane), formic acid, boron hydride complexes, ascorbic acid and the like are used. For cathode fuel, oxygen (including oxygen in air), hydrogen peroxide and the like are used. For cathode fuel, oxygen (including oxygen in air), hydrogen peroxide and the like are used.

In direct methanol fuel cells, methanol aqueous solution having a methanol concentration of 3 wt. % to 64 wt. % is used as the anode fuel. As in the anode reaction formula ($CH_3OH + H_2O \rightarrow CO_2 + 6H^+ + 6e^-$), 1 mol of methanol requires 1 mol of water, and the methanol concentration in this case corresponds to 64 wt. %. A higher methanol concentration in fuel is more effective for reducing the weight and the volume of the cell including the fuel tank of the same energy capacity. However, the higher methanol concentration tends to reduce the cell output due to the so-called crossover phenomenon in which methanol penetrates through the solid electrolyte and reacts with oxygen at the cathode to reduce the voltage. When the methanol concentration is too high, the crossover phenomenon is remarkable which reduces the cell output. To prevent the above problem, the optimum concentration of methanol is determined depending on the methanol permeability through the solid electrolytic membrane used. The cathode reaction formula in direct methanol fuel cells is (3/2)$O_2 + 6H^+ + 6e^- \rightarrow H_2O$, and oxygen (generally, oxygen in air) is used as the fuel in the cells.

To supply the anode fuel and the cathode fuel to the corresponding catalyst layers $132b$, $133b$, there are two methods: (1) a method of forcedly circulating the fuel by the use of an auxiliary device such as pump, that is, an active method, and (2) a method not using such auxiliary device, that is, a passive method, for example, the liquid fuel is supplied through capillarity or by free-fall, and vapor fuel is supplied by exposing the catalyst layer to air. It is also possible to combine these methods. The method (1) has some advantages in that water formed in the cathode area is circulated, and high-concentration methanol is usable as fuel, and that air supply enables high output from the cells, while it is difficult to downsize the cell because a fuel supply unit is necessary. On the other hand, the method (2) enables to downsize the cells, while the fuel supply ratio is readily limited and high output from the cells is often difficult.

The unit cell voltage of fuel cells is generally at most 1 V. It is desirable to stack up the unit cells in series, depending on the necessary voltage for load. As methods for stacking, a plane stacking in which unit cells are arranged on a plane, and a bipolar stacking in which unit cells are stacked up via a separator with a fuel passage formed on both sides thereof are used. In the plane stacking, the cathode (air electrode) is on the surface of the stacked structure so that it is easy to take in air and realizes a thin structure. Accordingly, the plane stacking is suitable for small-sized fuel cells. In addition, it is also possible to apply MEMS technology, in which a silicon wafer is processed to form a micropattern thereon and fuel cells are stacked on the processed silicon wafer.

Fuel cells are used in various appliances, for example, for automobiles, electric and electronic appliances for household use, mobile devices and the like. In particular, direct methanol fuel cells enable downsizing, lightweight and do not require charging. Having such advantages, they are expected to be used for various energy sources for mobile appliances and portable appliances. For example, mobile appliances in which fuel cells are favorably used include mobile phones, mobile notebook-size personal computers, electronic still cameras, PDA, video cameras, mobile game drivers, mobile servers, wearable personal computers, mobile displays and so forth. The portable appliances in which fuel cells are favorably used include portable generators, outdoor lighting devices, pocket lamps, electrically-powered (or assisted) bicycles and so forth. In addition, fuel cells are also favorable for power sources for robots for industrial and household use and for other toys. Moreover, they are further usable as power sources for charging secondary batteries that are mounted on these appliances.

Example 1

Next, examples of the present invention are described. In the following examples, the example 1 is described in detail. With regard to examples 2-8, only the conditions which differ from those of the example 1 are described. The examples 1, 2, 5-8 are examples of the embodiments in the present invention. The most preferable examples are the examples 7 and 8. Further, the examples 3 and 4 are the comparison experiments of the examples 1 and 2.

Production of Dope

As the solid electrolyte, sulfonated polyacrylonitrile butadiene-styrene with the sulfonation degree of 35% which is referred to as a material A is used. First, the material A is prepared by the following synthesis.

(1) Synthesis of 4-(4-(4-pentylcyclohexyl)phenoxymethyl) Styrene

A substance of the following composition is reacted for 7 hours at the temperature of 100° C. Thereafter, the obtained liquid is cooled to the room temperature. Water is added thereto to crystallize 4-(4-(4-pentylcyclohexyl)phenoxymethyl) styrene. The liquid containing 4-(4-(4-pentylcyclohexyl)phenoxymethyl) styrene is filtered. Thereafter, the crystal is washed by an aqueous solution containing water and acetonitrile at a ratio of 1 to 1. Thereafter, the 4-(4-(4-pentylcyclohexyl) phenoxymethyl) styrene is dried by the air.

| 4-(4-pentylcyclohexyl) phenol | 14 pts. wt. |
| 4-chloromethylstyrene | 9 pts. wt. |
| Potassium carbonate | 11 pts. wt. |
| N,N-dimethylformamide | 66 pts. wt |

(2) Synthesis of Graft Copolymer

A substance of the following composition is heated up to 60° C.

| Polybutadienlatex | 100 pts. wt. |
| Potassium rosinate | 0.83 pts. wt. |
| Dextrose | 0.50 pts. wt. |
| Sodium pyrophosphate | 0.17 pts. wt. |
| Ferrous sulfate | 0.08 pts. wt. |
| Water | 250 pts. wt. |

Polymerization is performed by dropping a mixture of the following composition onto the mixture of the above composition for 60 minutes.

| Acrylonitrile | 21 pts. wt. |
| 4-(4-(4-pentylcyclohexyl) phenoxymethyl) styrene | 62 pts. wt. |
| t-dodecylthiol | 0.5 pts. wt. |
| cumene hydroperoxide | 3.0 pts. wt. |

After the dropping, 0.2 pts. wt. of cumene hydroperoxide is added to the above, and cooled for one hour. Thereby, latex is obtained. The obtained latex is put into 1% sulfuric acid at the temperature of 60° C., and then, the temperature is increased to 90° C. to coagulate. The coagulated latex is properly washed and dried to obtain the graft copolymer.

(3) Synthesis of the Material A by Sulfonating the Graft Copolymer

The graft copolymer (100 pts. wt.) obtained by the process (2) is dissolved in methylene chloride (1300 pts. wt.). While the temperature of the obtained liquid is kept at 0° C. or below, concentrated sulfuric acid is slowly added thereto. Thereafter, the liquid is stirred for 6 hours to form precipitates. The precipitates are dried after the solvent is removed to obtain sulfonated polyacrylonitorile butadiene styrene. The percentage of introduction of the sulfonic acid group is 35% measured by titration. A dope A is formed of the material A which is the solid electrolyte, and the solvent which is N,N-dimethylformamide.

[Production of Solid Electrolyte Multilayer Membrane 62]

The solid electrolyte multilayer membrane 62 having three layers is produced by using a simultaneous co-casting apparatus 1111 by the following method. A second dope 115 is the dope A. A first dope 114 and a third dope 116 are mixture of the dope A and N, N-dimethylformamide in which the concentration of the solid electrolyte is 18.0 wt. %. To be more specific, there are three liquid passages to be connected to the casting die 89 of the dope A. A static mixer is provided to one of the three liquid passages. N,N-dimethylformamide is fed to the dope immediately before the static mixer so as to mix the N,N-dimethylformamide and the dope A by inline-mixing to form the dope 114. The static mixer has 60 mixing elements. Another static mixer is provided to one of the remaining liquid passages to form the third dope 116 in the same manner as the first dope 114.

In the simultaneous co-casting of the dopes 114-116, the casting width is set at 380 mm and the flow volume of the each dope is adjusted so as to form the thickness of the first, second and third surface layers of the dried solid electrolyte membrane 62 to be 5 μm, 5 μm and 40 μm, that is, 50 μm in total. To keep the temperature of each of the dopes 114-116 at 40° C., a jacket (not shown) is provided in the casting die 89 to supply the heat transfer medium at 40° C.

The casting die 89, a feed block 1119, and the liquid passages of the first to the third dopes 114-116 are insulated at 40° C. The casting die 89 is of the coat hanger type and the width thereof is 0.4 m. The casting die 89 is provided with heat bolts with 20 mm pitches for adjusting the thickness of the membrane. The casting die 89 has an automatic thickness control mechanism which adjusts clearance of the lip end by using the heat bolts. The heat bolts set a profile according to the total flow volume of the first to third dopes 114-116 through a high-precision pump based on the previously set program. To set the profile, a feedback control is carried out based on an adjustment program according to a profile measured by an infrared thickness gauge (not shown) installed in the membrane producing apparatus 33. The clearance of the lip end is adjusted such that a difference in the thickness between two arbitrary points 50 mm away from each other is 1 μm or less, and those 1 m away from each other in the width direction is 3 μm or less in a portion of the membrane 62 whose side edges have been cut off, to be more specific, in the portion 20 mm inward from each side edge of the membrane 62. Further, the clearance of the lip end is adjusted such that the thickness accuracy of the surface layers is ±2% or less, that of the inner layer is ±1% or less and that of the total thickness is ±1.5% or less (with respect to the above-mentioned values of the dried membrane 62.)

The dope discharged to the lip end of the casting die 81 is partially dried and becomes solid. In order to prevent such solidification of the dope, the liquid used as the solvent of the dope is supplied to both side edges of a three-phase contact line formed by both ends of the casting bead, those of the lip ends and the outside air. A pump with a pulsation of 5% or less is used for supplying the solvent.

The belt 82 is formed of SUS 316 having sufficient anti-corrosion and strength. The belt is polished such that the surface roughness is 0.05 μm or less. The thickness of the belt is 1.5 mm. The unevenness in the thickness is 0.5% or less. The belt 82 is driven by two rollers 85 and 86. A relative speed difference between the belt 82 and the rollers 85 and 86 are adjusted so as to be 0.01 m/min or less. Preferably, speed fluctuations of the belt 82 is 0.5% or less, and meandering thereof caused in a width direction while the belt 82 makes one rotation is 1.5 mm or less. In order to control the meandering, the position of the belt 82 is controlled by detecting the end positions thereof. Distance fluctuations between the lip end and the casting belt 82 are controlled to be 200 μm or less. In the casting chamber 63, a device for preventing air pressure fluctuations (not shown) which prevents the air pressure fluctuations inside of the casting chamber 63 is installed.

The first to third dopes 114-116 are cast to form the casting membrane 112. The dry air in a temperature range of 80° C. -120° C. is blown onto the casting membrane 112 by using the air blowers 91-93 until the remaining solvent reaches 30 wt. % with respect to the weight of the solid component, that is, the solid electrolyte contained in the material A. At the time the casting membrane 112 obtains the self-supporting property, the casting membrane 112 is peeled off as the membrane 62 from the belt 82. The membrane 62 is transported to the tenter device 64, and then through the tenter device 64 while the side edges of the membrane 62 are held by the clips 64a. In the tenter device 64, the membrane 62 is dried by the dry air at 140° C. until the remaining solvent reaches 15 wt. % with respect to the weight of the solid component. At the exit of the tenter device 64, the clips 64a release the side edges of the membrane 62. Then, the side edges of the membrane 62 are cut off by the edge slitting device 67 disposed in the downstream from the tenter device 64. Thereafter, the solvent substitution is performed by immersing the membrane 62 in a liquid mixture of methanol and water at the ratio of 1 to 1. The liquid mixture is insulated at 60° C. After the immersion, the membrane 62 is transported to the drying chamber 69 and dried in a range of 140° C.-160° C. while being transported by the rollers 68. Thus, the solid electrolyte multilayer membrane 62 which contains the solvent less than 3 wt. % is obtained.

The following evaluation is performed to the obtained membrane. The result of the evaluation is shown in table 1.

The numerals of the evaluation items in table 1 correspond to the numerals assigned to the following evaluation items.

1. Thickness

The membrane thickness is continuously measured at the velocity of 600 mm/min by using the electronic micrometer produced by Anritsu Corporation Ltd. The data obtained by the measurement is recorded on a chart sheet with a ½₀ scale at the velocity of 30 mm/min. The data curves are measured by using a ruler. According to the measured value, average thickness and variations in thickness with respect to the average thickness are obtained. In table 1, (a) is average thickness (unit: μm), (b) is the variation in thickness (unit: μm) with respect to (a).

2. Number of Defects

Light is emitted onto an area of the whole width×1 m on the membrane 62 and reflected. By the reflected light, defects such as deformation and the like are detected by visual inspection. Thereafter, the detected defects are checked with a polarization microscope and the number of the defects per 1 $mm^2$ is counted. Deformations after the sampling, for instance, flaws are not included in the counts.

3. Measurement of Proton Conductivity

Ten measurement points are selected at intervals of 1 m along a lengthwise direction of the obtained solid electrolyte membrane. Each of ten measurement points is punched out as a disc-shaped sample with a diameter of 13 mm. Each sample is interposed by two stainless steel plates. The proton conductivity thereof is measured by AC impedance method using 1470 and 1255B produced by Solartron Co., Ltd. The measurement is performed at 80° C., and relative humidity of 95%. The proton conductivity is indicated by AC impedance value (unit: S/cm) shown in table 1.

4. Power Density of the Fuel Cell 141

A fuel cell 141 is produced by using the membrane, and the output thereof is measured. The producing method and the measurement method of the power density of the fuel cell 141 are described in the following.

(1) Formation of Catalyst Sheet A Used as the Catalyst Layers 132b and 133b

2 g of platinum-supporting carbon is mixed with 15 g of the solid electrolyte (5% DMF solution), and dispersed for 30 minutes by using an ultrasonic disperser. The average particle diameter of the resulting dispersion is about 500 nm. The dispersion is applied onto the carbon paper with a thickness of 350 μm and dried. Thereafter, a disc-shape with a diameter of 9 mm is punched out of the carbon paper. Thus, the catalyst sheet A is formed. Note that the above platinum-supported carbon is Vulcan XC72 with 50 wt. % platinum. The solid electrolyte is the same as that in the membrane production.

(2) Formation of MEA 131

The catalyst sheet A is attached to both surfaces of the solid electrolyte membrane 62 such that the coated surfaces of the catalyst sheet A are attached the solid electrolyte membrane and heat-pressed at 80° C. under 3 MPa for 2 minutes. Thus, the MEA 131 is formed.

(3) Power Density of Fuel Cell 141

The MEA 131 obtained in the above process (2) is set in the fuel cell shown in FIG. 8. An aqueous 15 wt. % methanol solution is put into the fuel cell through an anode-side opening 151. At this time, a cathode-side opening 152 is kept open to the air. The anode 132 and the cathode 133 are connected via a multi-channel battery test system produced by Solartron Co., Ltd. to measure the power density ($W/cm^2$).

Example 2

As the solid electrolyte, sulfopropyl polyethersulfone with the sulfonation degree of 35% which is referred to as a material B is used. First, the material B is synthesized according to a method disclosed in Japanese Patent Laid-Open Publication No. 2002-110174. The dried material B and the solvent are mixed by the following composition to dissolve the material B in the solvent. Thus, the solid electrolyte dope 24 with 20 wt. % is formed. Other conditions are the same as those in the example 1. Hereinafter the dope 24 is referred to as a dope B.

| Material B | 100 pts. wt. |
|---|---|
| Solvent: N-Methyl-2-pyrrolidone | 400 pts. wt. |

Production of Solid Electrolyte Membrane 62

The dope B is used instead of the dope A. The temperature of the air from the air blowers 91-93 is set at 80° C.-140° C. The side edges of the membrane 62 are removed by the edge slitting device 67. Thereafter, the membrane 62 is immersed in the liquid mixture of methanol and water at the ratio of 1 to 1 insulated at 60° C. to substitute the liquid mixture for the solvent contained in the membrane 62. The membrane is dried in the drying chamber in a range of 160° C.-180° C. Thus, the solid electrolyte membrane 62 with the remaining solvent of less than 3% is obtained. The evaluation results of the obtained membrane 62 are shown in Table 1.

Example 3

Production of Solid Electrolyte Membrane

Only the dope A is cast without using the first dope 114 and the third dope 116 to form a single layer membrane with the thickness of 50 μm. Other conditions are the same as those in the example 1. The evaluation results of the obtained membrane are shown in Table 1.

Example 4

Production of Solid Electrolyte Membrane

Only the dope B is cast without using the first dope 114 and the third dope 116 to form a single layer membrane with the thickness of 50 μm. Other conditions are the same as those in the example 1. The evaluation results of the obtained membrane are shown in Table 1.

Example 5

The compound shown in chemical formula 1 is used as the solid electrolyte. The proton substitution, that is, the acid processing to obtain the compound of the chemical formula 1 is performed in the membrane production process as described below instead of prior to the dope production. A substance preceding the proton substitution, that is, the precursor of the solid electrolyte is referred to as a material C. The material C is dissolved in the solvent to form the dope for casting. The dope is formed in the same manner as the dope 24 in the example 1. The solvent is a mixture of the solvent component 1 and the solvent component 2. The solvent component 1 is a good solvent of the material C, and the solvent component 2 is a poor solvent of the material C. In the example 5, the chemical formula 1 with the following composition is used: X is Na, Y is $SO_2$, Z is (I) of the chemical formula 2, n is 0.33, m is 0.67, the number average molecular weight Mn is 61000, and the weight average molecular weight Mw is 159000.

| Material C | 100 pts. wt. |
|---|---|
| Solvent component 1 (dimethyl sulfoxide) | 256 pts. wt. |
| Solvent component 2 (methanol) | 171 pts. wt. |

The dope is cast onto the belt 82 and peeled off from the belt 82. The peeled membrane is referred to as the precursor membrane since the membrane is formed of the material C. The precursor membrane is subject to the same processes as those in the first example, and side edges of the precursor membrane are cut off by the edge slitting device 67. The proton substitution is performed to the precursor membrane through acid processing. Then, the membrane is washed. The acid processing is to make the precursor membrane contact to the aqueous acid solution. Through the acid processing, the structure of the precursor is changed to that shown in the chemical formula 1, that is, the solid electrolyte. To contact the membrane to the aqueous acid solution, the aqueous acid solution is continuously supplied to the liquid bath and the membrane formed of the solid electrolyte is immersed in the aqueous acid solution. The water is used for washing the membrane after the acid processing. After the washing, the membrane is transported to the drying chamber 69. The evaluation results of the obtained membrane are shown in table 1.

Example 6

A compound shown in the chemical formula 1 which is different from that shown in the example 5 is used as the solid electrolyte. The proton substitution for obtaining the compound of the chemical formula 1 is performed in the membrane production process instead of prior to the dope production. The precursor used as the component of the dope is referred to as a material D. The solvent is a mixture of the solvent component 1 and the solvent component 2 as shown below. The solvent component 1 is a good solvent of the material D, and the solvent component 2 is a poor solvent of the material D. In the example 6, the chemical formula 1 with the following composition is used: X is Na, Y is $SO_2$, Z is (I) and (II) of the chemical formula 2, n is 0.33, m is 0.67, the number average molecular weight Mn is 68000, and the weight average molecular weight Mw is 200000. In the chemical formula 2, (I) is 0.7 mol %, (II) is 0.3 mol %. Other conditions are the same as those in the example 5.

| Material D | 100 pts. wt. |
|---|---|
| Solvent 1 (dimethylsulfoxide) | 200 pts. wt. |
| Solvent 2 (methanol) | 135 pts. wt. |

Example 7

In the example 7, after the washing, the casting membrane 24*a* is peeled off from the PET film to obtain the precursor membrane. After the washing, the membrane is immersed in the water at 30° C. for five minutes and the water on the membrane is removed after the immersion. Other conditions are the same as those in the example 5.

Example 8

The membrane is produced under the same conditions as those in the example 7 except that the material C is changed to the material D.

TABLE 1

| | Evaluation Item | | | |
|---|---|---|---|---|
| | 1 (μm) | 2 | 3 | 4 |
| | (a) (b) | (defects/m²) | (S/cm) | (W/cm²) |
| Example 1 | 51 ±1.5 | 0.4 | 0.08-0.10 | 0.45-0.52 |
| Example 2 | 52 ±1.5 | 0.3 | 0.10-0.11 | 0.50-0.53 |
| Example 3 | 50 ±3.7 | 12.4 | 0.04-0.06 | 0.26-0.30 |
| Example 4 | 51 ±3.2 | 9.1 | 0.07-0.09 | 0.35-0.43 |
| Example 5 | 51 ±1.5 | 0.4 | 0.11-0.13 | 0.51-0.54 |
| Example 6 | 52 ±1.5 | 0.3 | 0.11-0.13 | 0.52-0.55 |
| Example 7 | 51 ±1.4 | 0.3 | 0.12-0.14 | 0.52-0.55 |
| Example 8 | 51 ±1.3 | 0.2 | 0.12-0.15 | 0.53-0.56 |

According to the results of the above examples, the present invention enables to continuously produce the solid electrolyte multilayer membrane with excellent planarity and reduced defects. The obtained solid electrolyte multilayer membrane is suitably used for the solid electrolyte layer of the fuel cell.

INDUSTRIAL APPLICABILITY

The solid electrolyte multilayer membrane, the method and the apparatus for producing the same, the membrane electrode assembly and the fuel cell using the solid electrolyte multilayer membrane of the present invention are applicable to the power sources for various mobile appliances and various portable appliances.

The invention claimed is:

1. A producing method for a solid electrolyte multilayer membrane comprising the steps of:
   (A) forming a layered casting membrane by casting plural dopes from at least one casting die onto a moving support, each of said dopes containing a solid electrolyte and an organic solvent and having different composition;
   (B) peeling said layered casting membrane from said support as a layered membrane containing said organic solvent;
   (C) contacting at least one of: said casting membrane on said support and said layered membrane peeled from the support with a liquid which is a poor solvent of said solid electrolyte and having a lower boiling point than said organic solvent, to replace said organic solvent in said casting membrane or said layered membrane with said liquid; and
   (D) drying said layered membrane to form a solid electrolyte multilayer membrane,
   wherein said liquid includes a first liquid stored in a first liquid bath and a second liquid stored in a second liquid bath provided downstream from said first liquid bath, and said step (C) is conducted in each of said first and second liquid baths, and
   wherein said second liquid has a lower boiling point than said first liquid.

2. A producing method according to claim 1, wherein said dopes are a first dope and a second dope each of which having a different combination ratio of said solid electrolyte and said organic solvent.

3. A producing method according to claim 2, wherein a second casting die for casting said second dope is disposed downstream from a first casting die for casting said first dope.

4. The producing method according to claim 2, wherein said layered casting membrane includes plural solid electrolyte layers each of which is formed from each of said plural dopes.

5. A producing method according to claim 1, wherein a thickness of said solid electrolyte multilayer membrane is in a range of 10 μm to 200 μm.

6. A producing method according to claim 1, wherein said organic solvent is a mixture of a first component which is a compound of the poor solvent of said solid electrolyte and a second component which is a compound of a good solvent of said solid electrolyte.

7. A producing method according to claim 6, wherein a weight ratio of said first component with respect to a sum of weights of said first component and said second component is not less than 10% and less than 100%.

8. The method of claim 6, wherein the good solvent includes DMF, DMAc, DMSO or NMP.

9. A producing method according to claim 6, wherein said first component contains alcohol having one to five carbons, and said second component contains dimethylsulfoxide.

10. A producing method according to claim 1, wherein said solid electrolyte is a hydrocarbon polymer.

11. A producing method according to claim 10, wherein said hydrocarbon polymer is an aromatic polymer having a sulfonic acid group.

12. A producing method according to claim 11, wherein said aromatic polymer is a copolymer formed of structural units represented by general formulae (I), (II) and (III) shown in chemical formula 1:

[Chemical formula 1]

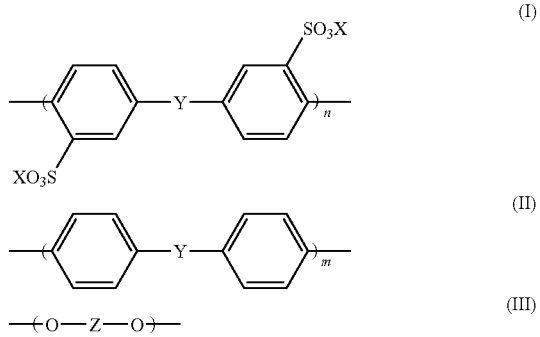

(X is H, Y is $SO_2$, Z has a structure represented in (I) or (II) in a chemical formula 2, n and m satisfy $0.1 \leq n/(m+n) \leq 0.5$)

[Chemical formula 2]

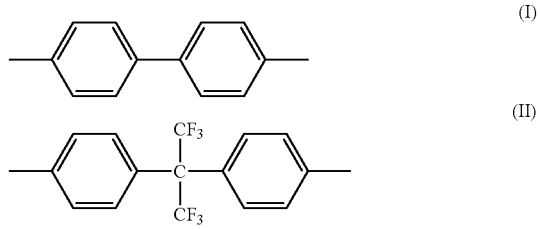

13. The producing method according to claim 1, further comprising the step of:

after said step (C), removing said liquid on said casting membrane or said membrane by use of at least one liquid remover.

14. The method of claim 1, wherein the poor solvent includes an alcohol having 1 to 5 carbons, methyl acetate or acetone.

* * * * *